United States Patent [19]
Yonezawa

[11] Patent Number: 5,825,432
[45] Date of Patent: Oct. 20, 1998

[54] COMMUNICATION APPARATUS IMAGE PROCESSING APPARATUS, COMMUNICATION METHOD, IMAGE PROCESSING METHOD AND MEDIUM

[75] Inventor: Hiroki Yonezawa, Tokyo, Japan

[73] Assignee: Canon Kabushiki Kaisha, Japan

[21] Appl. No.: 789,391

[22] Filed: Jan. 29, 1997

[30] Foreign Application Priority Data

Jan. 30, 1996 [JP] Japan .................................. 8-014201

[51] Int. Cl.⁶ ..................................................... H04N 7/18
[52] U.S. Cl. ........................... 348/563; 348/153; 348/159
[58] Field of Search .................................. 348/563, 409, 348/458, 154, 17, 13, 552, 211, 212; H04N 7/18

[56] References Cited

U.S. PATENT DOCUMENTS

| | | | |
|---|---|---|---|
| 4,992,866 | 2/1991 | Morgan | 348/153 |
| 5,109,278 | 4/1992 | Erikson | 348/153 |
| 5,305,100 | 4/1994 | Choi | 348/159 |
| 5,583,796 | 12/1996 | Reese | 348/159 |
| 5,625,410 | 4/1997 | Washino | 348/154 |

*Primary Examiner*—Howard Britton
*Attorney, Agent, or Firm*—Morgan & Finnegan LLP

[57] ABSTRACT

A monitor system is provided a display for displaying images from a plurality of image transmission sources connected to a network and a control unit for limiting the number of images displayed as an apparatus suitable for the monitor system which control the transmission sources while utilizing maps indicating arrangement information of the transmission sources so that the operability of the monitor operator is improved and the monitor system is easy to use. A monitor terminal having a map window for presenting status of areas in which video cameras as the image transmission sources are arranged and an image display window for displaying a plurality of video camera images includes a unit for changing the number of displayed images in accordance with a size of the image display window.

20 Claims, 22 Drawing Sheets

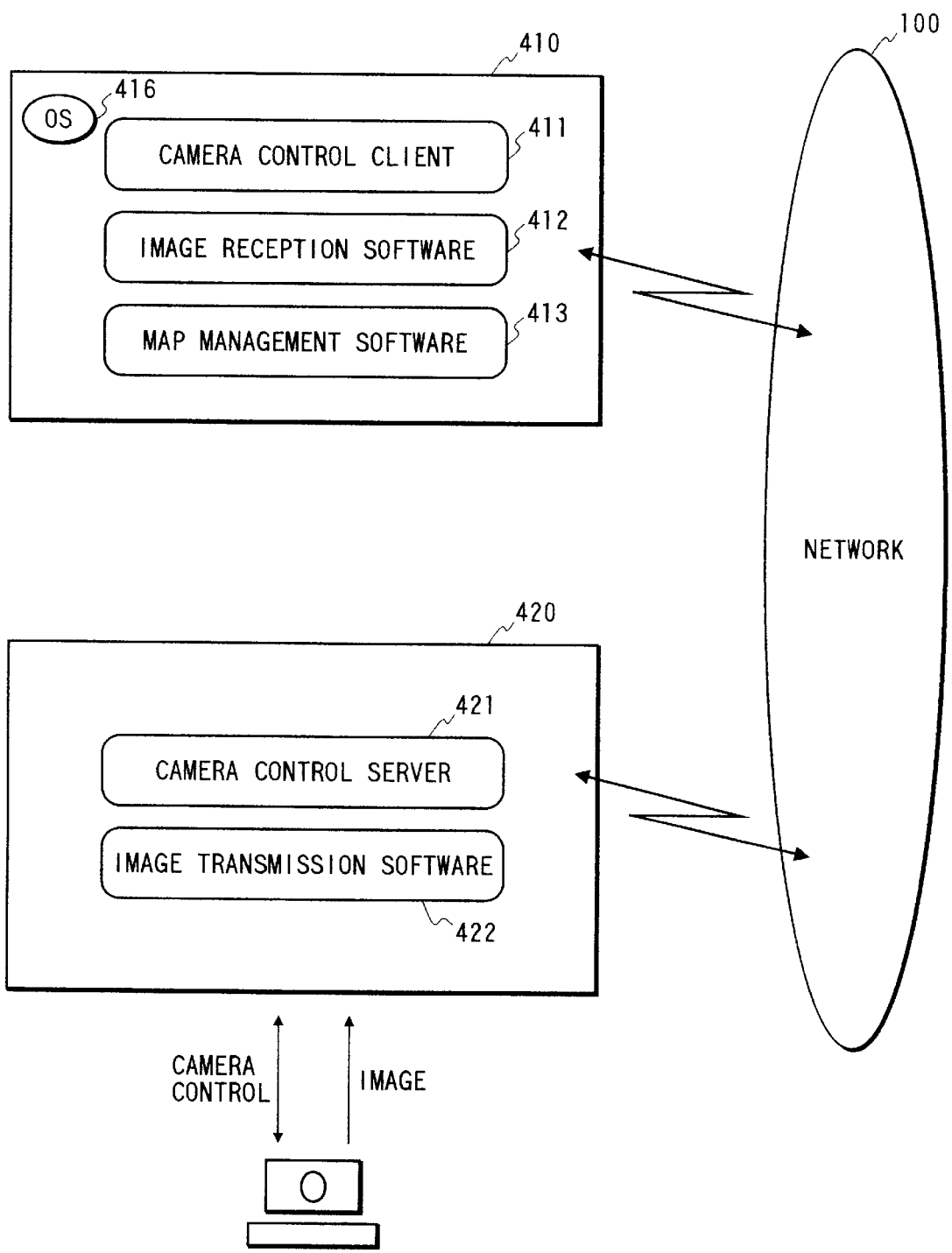

5,825,432

COMMUNICATION APPARATUS IMAGE PROCESSING APPARATUS, COMMUNICATION METHOD, IMAGE PROCESSING METHOD AND MEDIUM

BACKGROUND OF THE INVENTION

1. Field of the Invention

The present invention relates to communication apparatus and method, and image processing apparatus and method.

2. Related Background Art

A monitor apparatus as an example of such a communication apparatus comprises several video cameras, a synthesizer for analog-synthesizing images and a selectable unit called a switcher. It is mainly utilized in a relatively small scale building and it is called a local monitor system. Contrary to the local monitor system, a remote monitor system which uses a digital network such as LAN or ISDN instead of an analog cable for an image transmission line to allow significant extension of the transmission line is recently being developed.

In recent monitor systems, several systems which utilize IBM PC compatible machines (PC) as monitor terminals to realize image display and system control by Graphical User Interface (GUI) have been announced. By utilizing the computer GUI in the monitor system, even a person who is not familiar with the system can simply handle it.

However, in the system of this type, a map display area and image display area on the monitor overlaps so that the above advantage may be lost.

In some approaches, the respective display areas are fixedly positioned at specific positions of the image display unit of the monitor terminal or the number of displayable images is limited, but it is true that these approaches restrict the operability of the monitor operator who is a user.

SUMMARY OF THE INVENTION

It is an object of the present invention to provide communication apparatus, image processing apparatus, communication method, image processing method and machine-readable medium which provide easy-to-monitor display.

It is another object of the present invention to provide communication apparatus, image processing apparatus, communication method, image processing method and machine-readable medium which graphically provide information necessary for a user.

It is other object of the present invention to provide a communication apparatus which allows easy connection of a line with a desired terminal.

It is a further object of the present invention to provide a communication apparatus which allows easy observation of an image received from an image generation apparatus.

In order to achieve those objects, in accordance with a preferred embodiment of the present invention, there is provided an image processing apparatus comprising supply means for displaying arrangement diagram indicating an arrangement of a plurality of image transmission sources and images from the image transmission sources in a window on a monitor, and control means for controlling a size of the window in accordance with the number of images to be displayed in said window or vice versa.

It is still further object of the present invention to provide communication apparatus, image processing apparatus, communication method and image processing method having novel functions.

Other objects and features of the present invention will be apparent from the following description of the embodiments and the accompanying drawings.

BRIEF DESCRIPTION OF THE DRAWINGS

FIG. 2 shows a software block diagram of the embodiment of the present invention.

DETAILED DESCRIPTION OF THE PREFERRED EMBODIMENTS

[Embodiment 1]

An Embodiment 1 of the present invention is now explained in detail with reference to the drawings.

Figure 1:
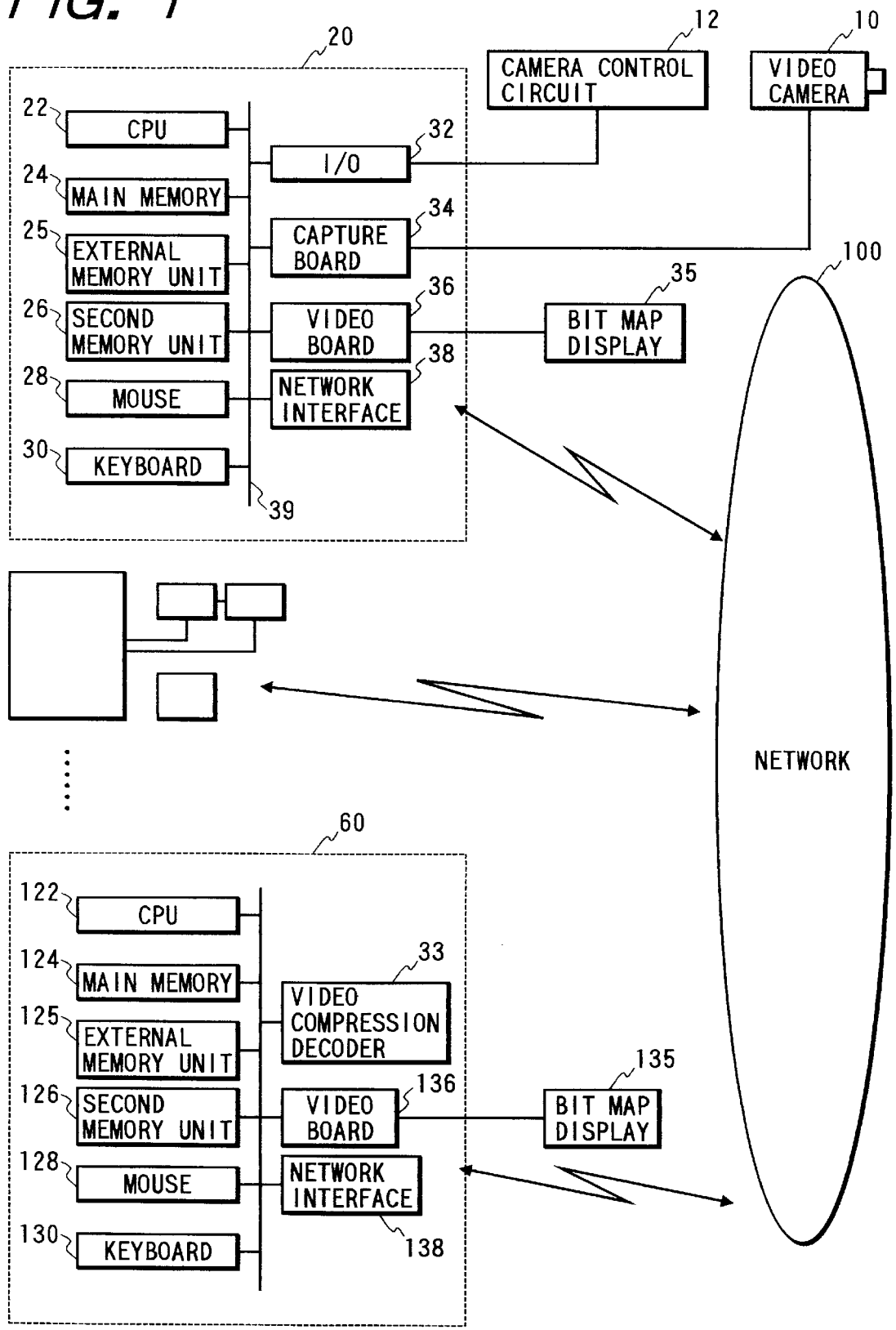
FIG. 1 shows a block diagram of an image transmission terminal and a monitor terminal in accordance with one embodiment of the present invention.

FIG. 1 shows a block diagram of a schematic configuration of an image transmission terminal. The image transmission terminal of the present embodiment is used together with a video camera as an example of an image signal generation apparatus. The terminal receives a video camera control signal from a monitor terminal as an image receiving terminal, actually controls the video camera 10, conducts A/D conversion and data compression of the image signal from the video camera 10 and transmits it to a network.

In FIG. 1, numeral 10 denotes the video camera and numeral 12 denotes a camera control circuit for directly controlling panning, tilting, zooming, focusing and aperture of the video camera 10 in accordance with an external control signal. The external control signal may be inputted from an interface compatible to RS-232C.

The camera control circuit 12 may not be required when the video camera 10 cannot control the panning and the tilting but the camera control circuit 12 may instead control the turn-on/off of a power of the video camera 10. Numeral 20 denotes a computer which controls the video camera 10 connected to the camera control circuit 12 by sending a control code to the camera control circuit 12 and transmits the image data derived from the video camera 10 to the network through a network interface 38. It may be a workstation (WS) or a personal computer (PC).

A configuration of the computer 20 in the present embodiment is now explained.

Numeral 22 denotes a CPU which control the overall system, numeral 24 denotes a main memory, numeral 26 denotes a secondary storage device such as a hard disk, and numeral 28 denotes a mouse as a pointing device, although it is not limited to the mouse but other device such as a touch panel on a display 35 may be used. Numeral 30 denotes a keyboard. Numeral 25 denotes a removable external storage device such as floppy disk or a CD ROM. Software in the present system, particularly software which contains the procedures shown in the present embodiment may be stored in such a medium and read from the medium and the network interface 38 and stored in the secondary storage device 26.

Numeral 32 denotes an I/O board which connects the camera control circuit 12 and transmits and receives the camera control signal, and numeral 34 denotes an image capture board for capturing an image output signal VD of the video camera 10. The image output signal may be an analog signal such as an NTSC signal or a digital signal. In case of the analog signal, a function to conduct A/D conversion must be provided. The image capture board 34 need not be provided with a data compression function, but when the compression function is not provided, software compression is preferable. The captured image is outputted to the video board 36 from a graphic board 34 through a path 39, and displayed at any position on a bit map display 35. The control of the display position is conducted by the CPU 22 which indicates the display position and/or area to the video board 36. Numeral 39 denotes a system bus which interconnects the devices distributed between the CPU 20 and the interface 38.

With the above configuration, the image may be transmitted to a remote monitor terminal through the network and the camera control signal may be received from the monitor terminal to control the camera. Numeral 60 denotes a schematic configuration of the monitor terminal (image receiving terminal). The monitor terminal 60 sends the control signal for the video camera 10 to the image transmission terminal 20, which controls the video camera 10 in accordance with the control signal and sends back a resulting status of the video camera 10. The monitor terminal 60 displays the status of the video camera on the display device such as a bit map display 135. It also receives the image data sent from the image transmission terminal 20, software-decompresses it, that is, decompresses the encoded data and displays it on the display device on real time. As seen from the drawing, the monitor terminal 60 has the same configuration as that of the image transmission terminal 20 from which the video camera 10, the camera control unit 12 and the capture board 34 are removed, and the elements having the same functions are designated by the same numerals with addition of "100". They need not be absolutely removed. When the capability of the CPU 22 is so low that it takes a long time for the decompression, an extended hardware having the decompression function may be mounted.

With the above configuration, the image from the remote image transmission terminal 20 may be received through the network 100, decompressed and displayed at any position on the bit map display 135 or the monitor display device, and the video camera control code complying to the control direction of the video camera inputted by the operator from the keyboard 130 or the mouse 128 may be transmitted to the image transmission terminal.

FIG. 2 shows a software configuration of the present embodiment. Software 410 of the monitor terminal 60 and software 420, 430, . . . of the plurality of image communication terminals 20 are connected to a network 100. Installed in the software 410 of the monitor terminal are a camera control client 411 for remotely controlling the camera connected to the software 420, 430, . . . of the image communication terminal on the network, image receiving software 412 for decompressing and displaying the image data sent from the image communication terminal in the form of packet and map managing software 413 having a GUI capable of graphically displaying a position panning and zooming of the camera by a map, a camera symbol and scope display of FIG. 6.

The image receiving software 412 functions as a center to manage the cameras of all image transmission terminals connected to the network 400 and maintains information on the names of the respective cameras, the host names of the computers to which the cameras are connected, the camera status such as panning/tilting and zooming, information on the camera as to controllability, the camera being controlled, the camera whose image is being displayed. Those information are shared by the camera control client 411 and the map managing software 413 and used for the change of display of the camera symbol. The software 421 controls the camera status such as panning/tilting, zooming and white balance for the camera connected to the terminal and stores the image data outputted from the camera, and it is called a camera control server. Numeral 422 denotes software which cooperates with the image receiving software.

Figure 4:
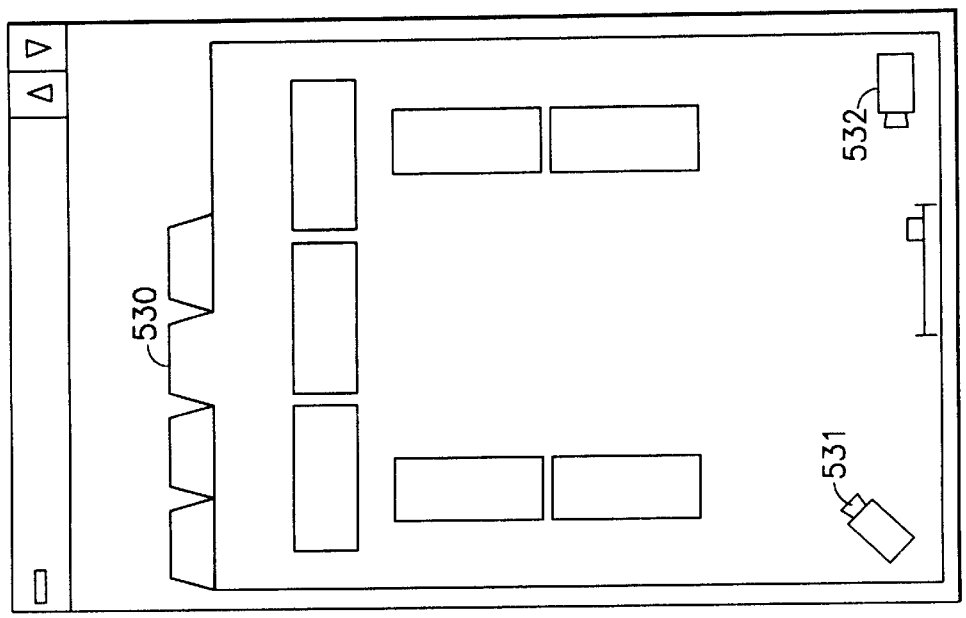
FIG. 4 shows a display when a map is switched to 530.
Figure 3:
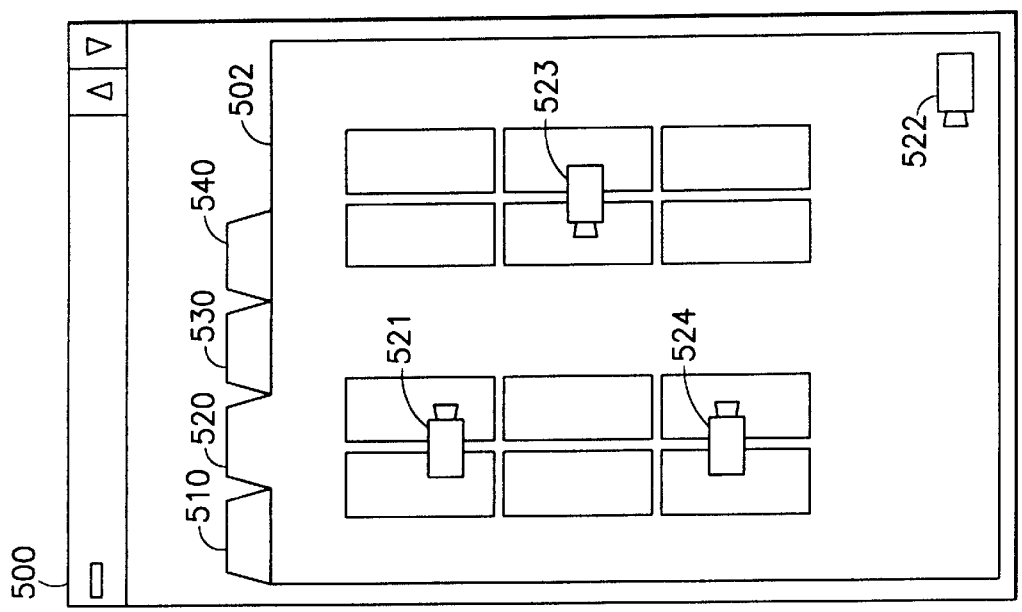
FIG. 3 shows an image in the embodiment.
Figure 5:
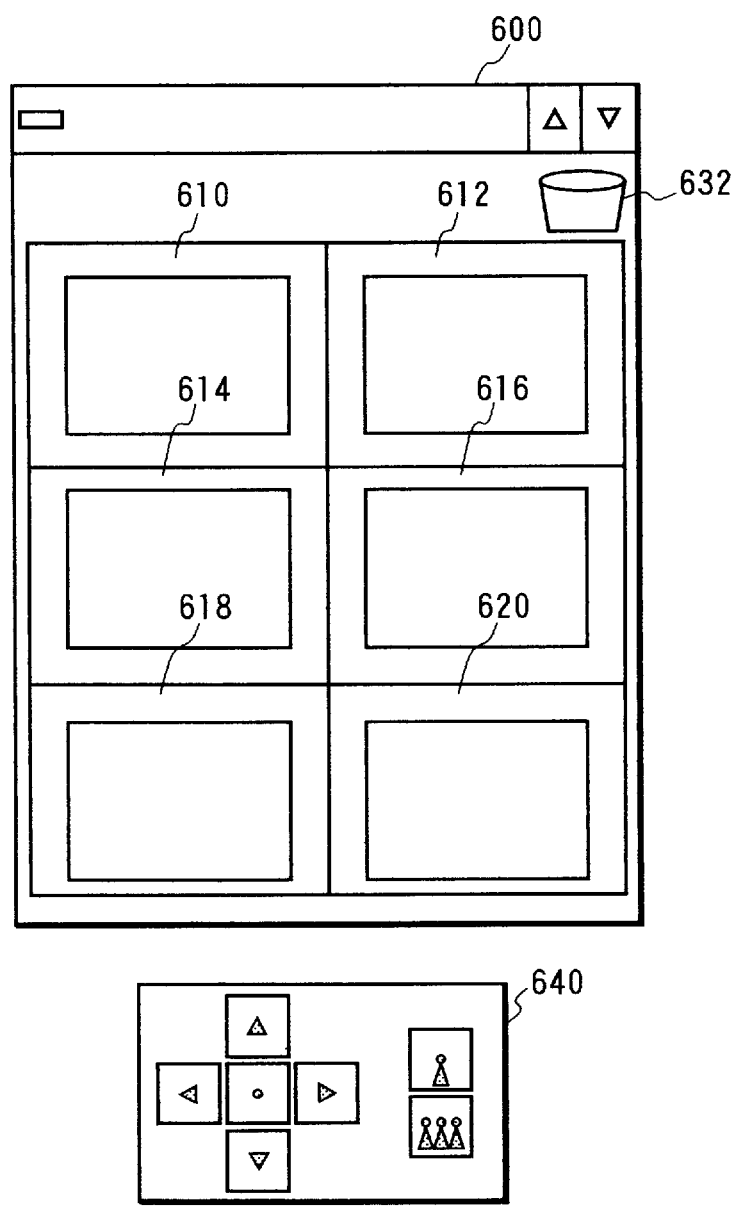
FIG. 5 shows an image display window 600 in the embodiment.

FIG. 3 shows a screen displayed on the bit map display 135 of the monitor terminal 410. Numeral 500 denotes a map window. In the present embodiment, a plurality of maps 520, 530, 540, . . . indicating layouts of offices, stores and warehouses are managed. The number of maps depends on the system performance and there is no specific limit. Each map is tagged, and by clicking the tag by a mouse pointer, the tagged map is displayed in the map display area 502. At the same time, a camera symbol arranged on the map is displayed. In FIG. 3, the map 520 of the maps 510 to 540 is displayed in the map display area 502 and the camera icons 521, 522, 523, . . . arranged on the map 520 are displayed. When the tag of the map 530 is clicked, the map 530 is displayed in the map display area 502 as shown in FIG. 4, and the camera icons 531, 532, 533, . . . arranged on the map 530 are also displayed. FIG. 5 shows a window 600 for displaying the input image signal. In FIG. 5, the image signal received through the network 100 is displayed in the window.

In FIG. 5, numeral 600 denotes an image display window. Areas 611, 612, 614, 616, 618, 620, . . . in the image display window are image display areas. Six areas are provided in the present embodiment although it is not restrictive. The map window 500 shown in FIG. 3 and the image display window 600 shown in FIG. 5 may be displayed on one screen or they may be displayed on separate screens or separate monitor devices. Numeral 632 denotes a dust box icon for detecting the displayed camera image from the image display area. Numeral 640 denotes a camera control panel which contains various camera control buttons to control the panning/tilting and the zooming of a selected camera. The panel 640 may also be displayed on the same screen as that for the windows 500 and 600 or on a separate screen.

Figure 6:
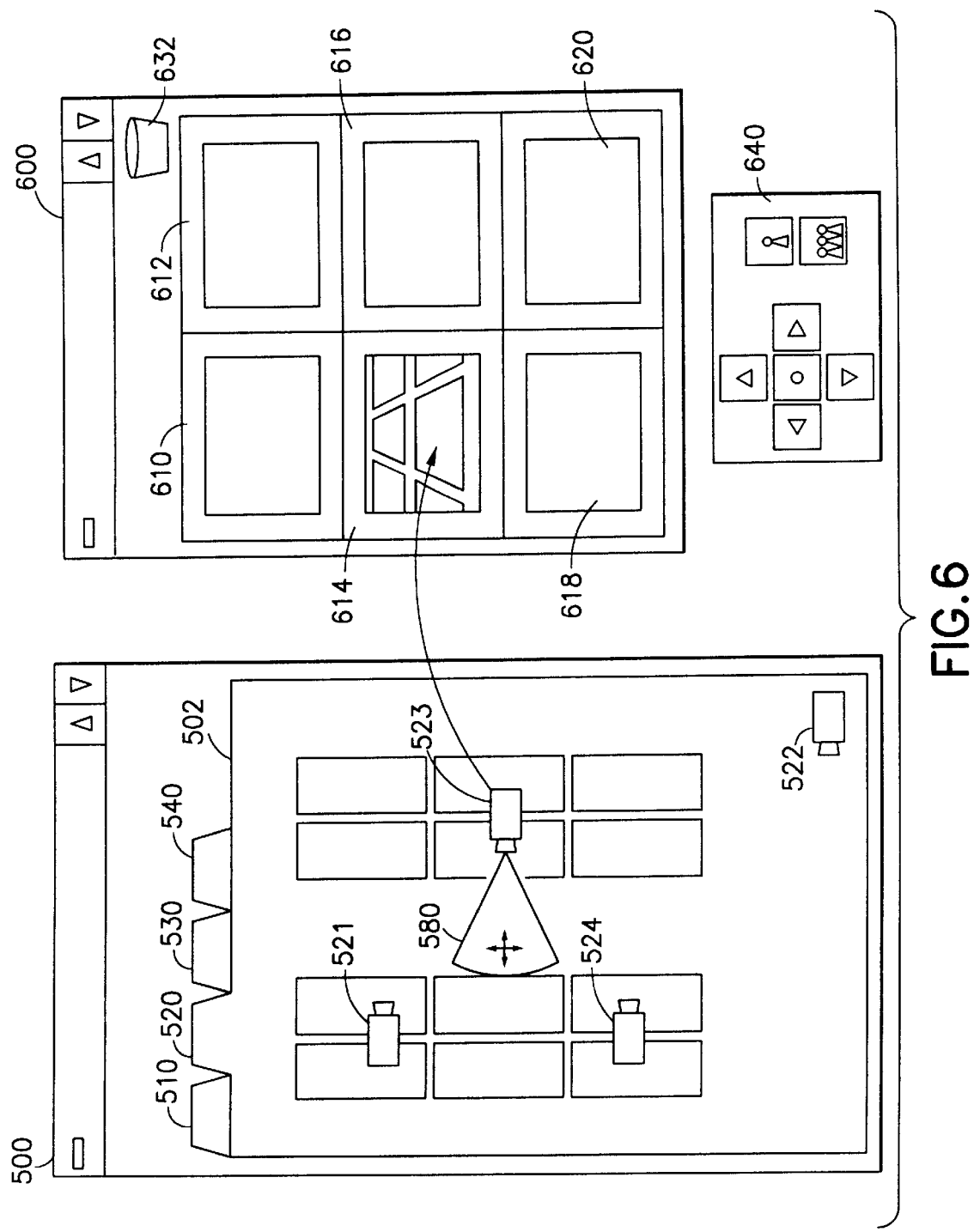
FIG. 6 shows a display by D&D operation.

Referring now to FIGS. 6 to 10, a graphical user interface (GUI) of the monitor system of the present embodiment is explained. In the present embodiment, when a camera icon on the maps 520, 530, . . . is dragged and dropped (hereinafter referred to as a D&D operation) to any image display area in the image display window, a moving image from the camera corresponding to the dragged and dropped icon is displayed in the dropped image display area. FIG. 6 shows a display when the video camera 523 is D&Ded in the image display area 614.

Figure 7:
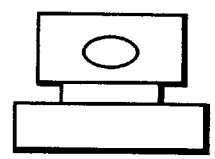
FIG. 7 shows a shape of a mouse cursor in the D&D operation.

During the dragging, the shape of the mouse cursor is changed to a camera shape as shown in FIG. 7 so that the user may confirm that the D&D operation is in progress. The map managing software 413 searches an ID number of the camera from the position information of the dragged camera and informs the ID of the D&Ded camera to the image receiving software, which determines from the ID the panning/tilting of the camera, the camera name and the host name to which the camera is connected and informs those information to the camera control client 411 and the map management software 413. Based on this information, the camera control client 411 connects the camera control server of the image transmission terminal top which the camera is connected, to the network.

Figure 9:
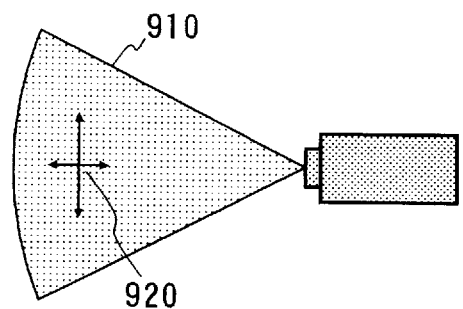
FIG. 9 shows a display of a camera icon which is displaying an image.

The camera control is subsequently conducted by the both and the information such as the panning/tilting of the camera is always informed from the camera control client 411 to the image receiving software 412. The map managing software updates the maps stored in the video board 136 by changing the orientation of the camera icon to fit to the actual orientation of the camera, drawing a scope 910 indicating that the display is in process as shown in FIG. 9 and drawing a control pointer 920 for controlling the panning/tilting and the zooming of the camera in the scope 910. The map managing software is always informed of the information on the panning/tilting of the camera from the image receiving software 413, and when the status such as the panning/tilting or the zooming of the camera is changed by the camera control panel 640, it is immediately reflected to the camera icons 521, 522, 523, . . . , 531, 532, 533, . . . . The actual transmission of the image is conducted by a request from the image receiving software 412.

The image receiving software 412 requests to transmit one frame of data to the image transmission software 422 of the image transmission terminal to which the camera is connected, through the network 100. When the image transmission software 422 receives the request, it divides the latest captured frame of data into packets and transmits them to the image receiving software 412.

The image receiving software 412 restructures the frame from the packets, displays it in the image display area and issues an image transmission request again. By rapidly repeating the above process, the image at a remote location can be transmitted and displayed through the network. Thus, the moving image from the video camera can be displayed on the bit map display.

Figure 8:
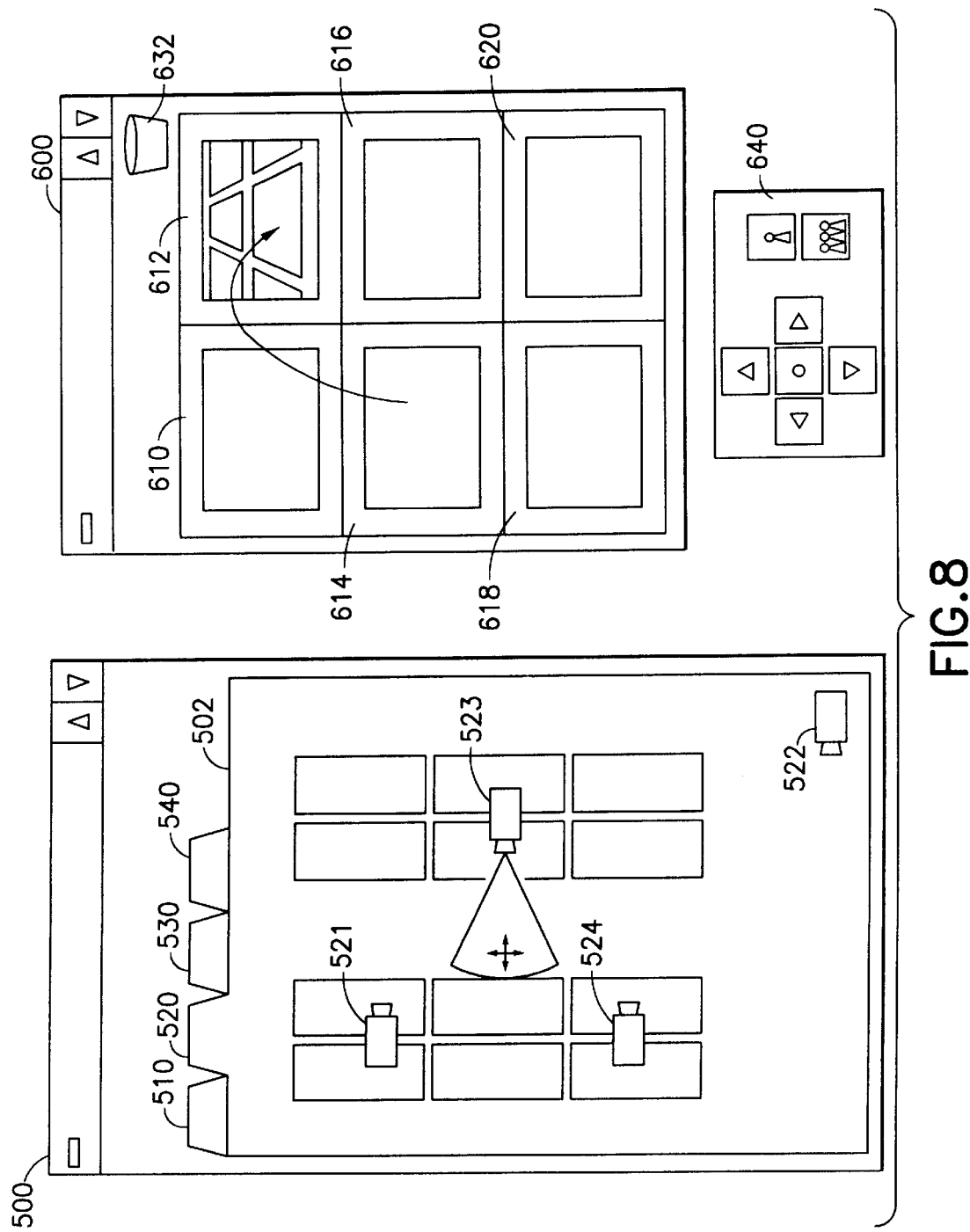
FIG. 8 shows a display when a display area of the image by the D&D operation is changed.

When the images of a plurality of cameras are to be displayed, it is attained by sequentially repeating the processes of issuing an image transmission request to the image transmission software to which each camera is connected, compressing the captured image, dividing into packets, transmitting the packets, receiving the packets, restructuring the frame, decompressing and displaying. The movement of the display position of the video camera image is attained by D&Ding the displayed image to a desired destination image display area as shown in FIG. 8. FIG. 8 shows a display when the image of the video camera 523 displayed in the image display area 614 is moved to 612.

Figure 10:
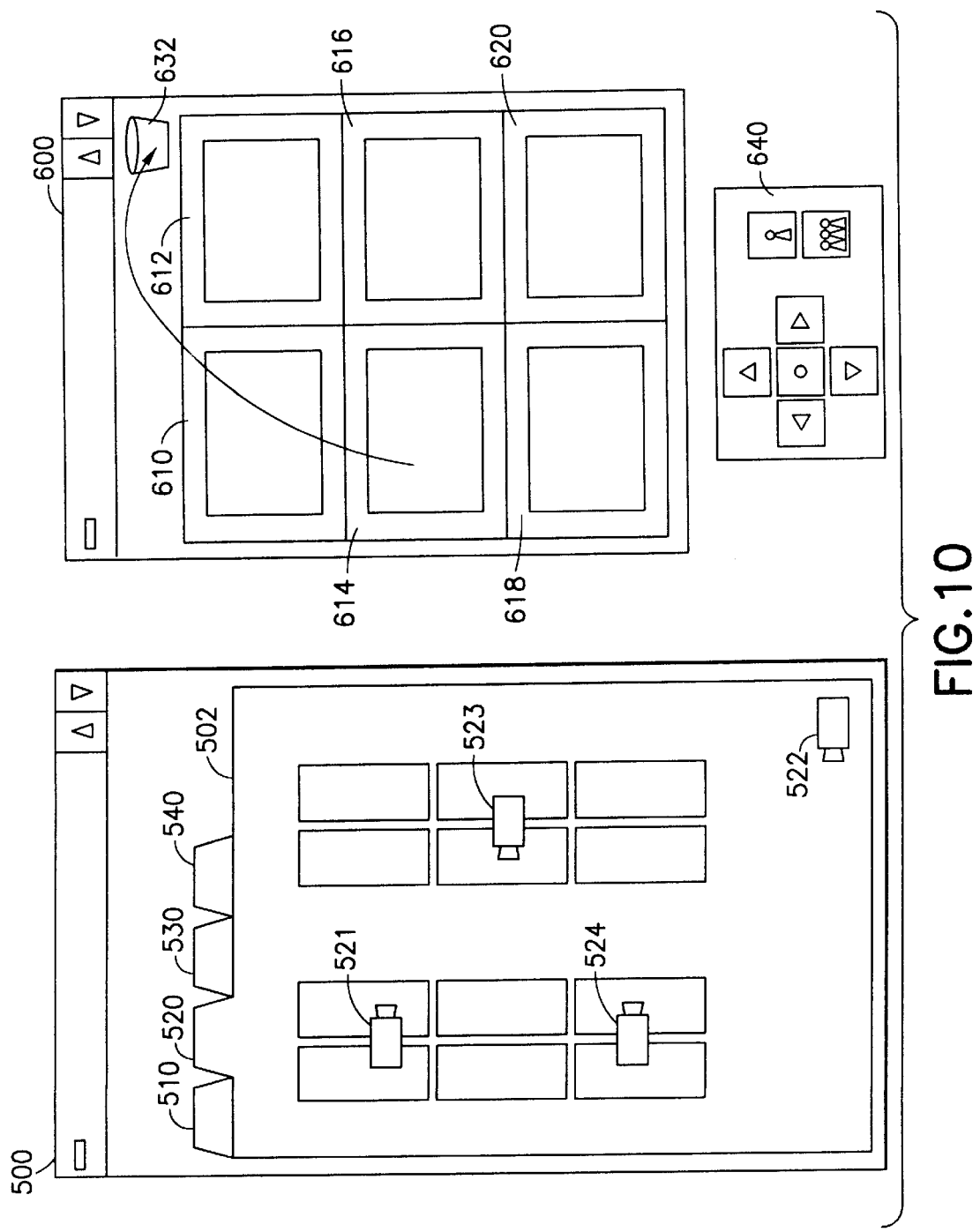
FIG. 10 shows a display when the display of the image by the D&D operation is stopped.

The image receiving software 412 clears the image display area and changes the internal parameters so that the D&D position is defined as the area in which the video camera image is displayed. Subsequently, the image is displayed at the D&D position. The logical network is not disconnected by this process. Namely, once the network is connected, it is not disconnected until the image display area is D&Ded to the dust box icon 632. When the display of the video camera image is to be stopped, the image display area in which the video camera image whose display is to be stopped is D&Ded to the dust box icon 632 in the image display window as shown in FIG. 10. FIG. 10 shows a display after the stop of the display of the image of the video camera 523 displayed in the image display area 614. The image receiving software 412 clears the image display area and stops to issue the image transmission request to the image transmission software. It also informs to the camera control client 411 and the map managing software 413 of the stop of the display. When the camera control client 411 received the notice, it disconnects the image transmission terminal from the network and clears the image display area. The map managing software 413 deletes the display of the scope from the camera icon 523 of the corresponding camera and updates the map.

In accordance with the present embodiment, means for establishing the logical network connection between the monitor terminal and the image transmission terminal by D&Ding the camera symbol on the map to the image display area, means for D&D moving the image display area in which the video camera image is displayed to any other image display area, and means for disconnecting the logical network connection by D&Ding the image display area in which the video camera image is displayed to the display stop symbol are provided so that the display position of the video camera image may be freely arranged to facilitate the handling by the operator of the monitor system who is the user and the video camera images to be simultaneously displayed may be selected and the flexibility is offered to the operation of the monitor system.

Figure 11:
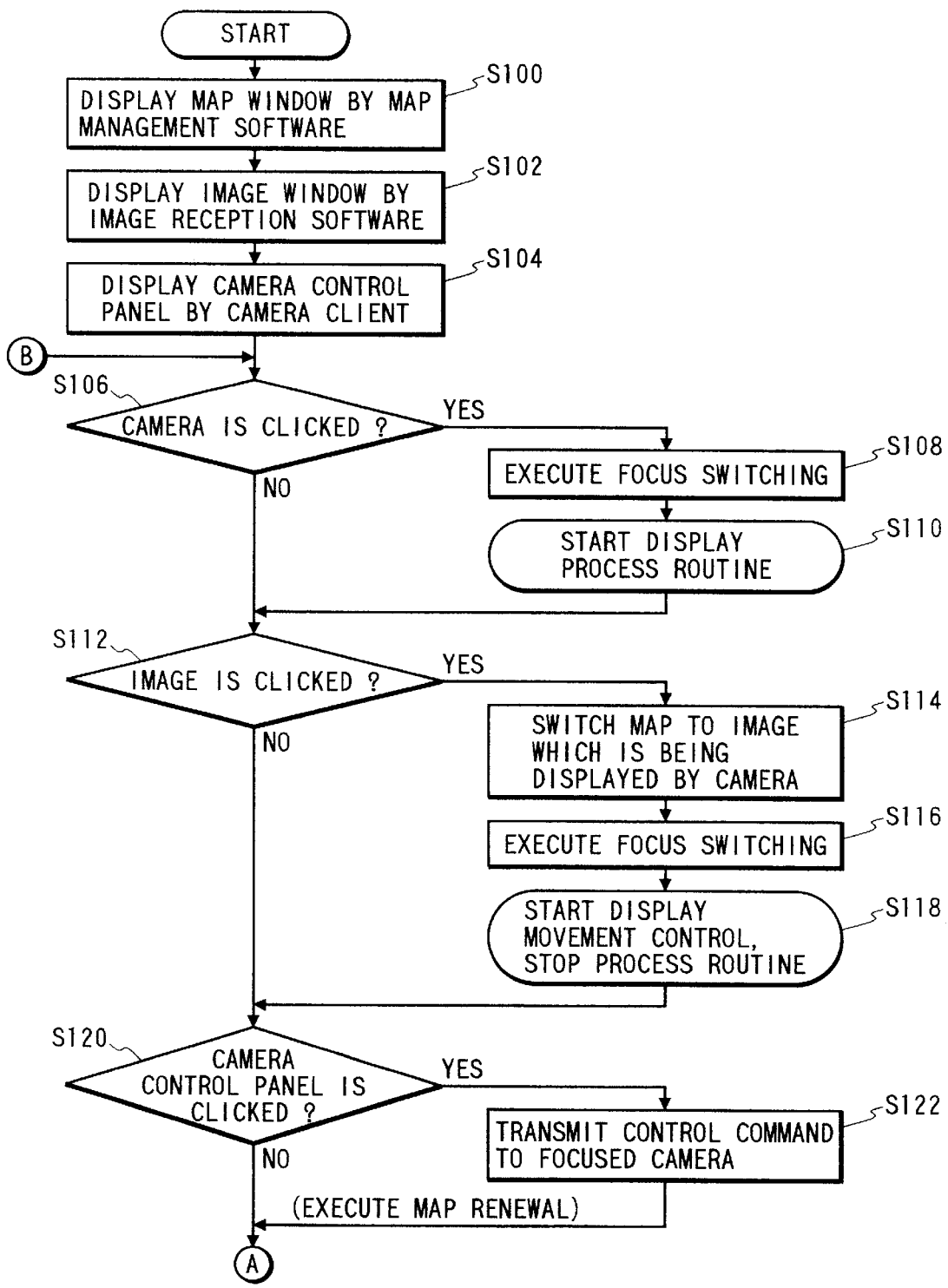
FIG. 11 shows a flow chart of an entire operation of the apparatus of the embodiment.
Figure 12:
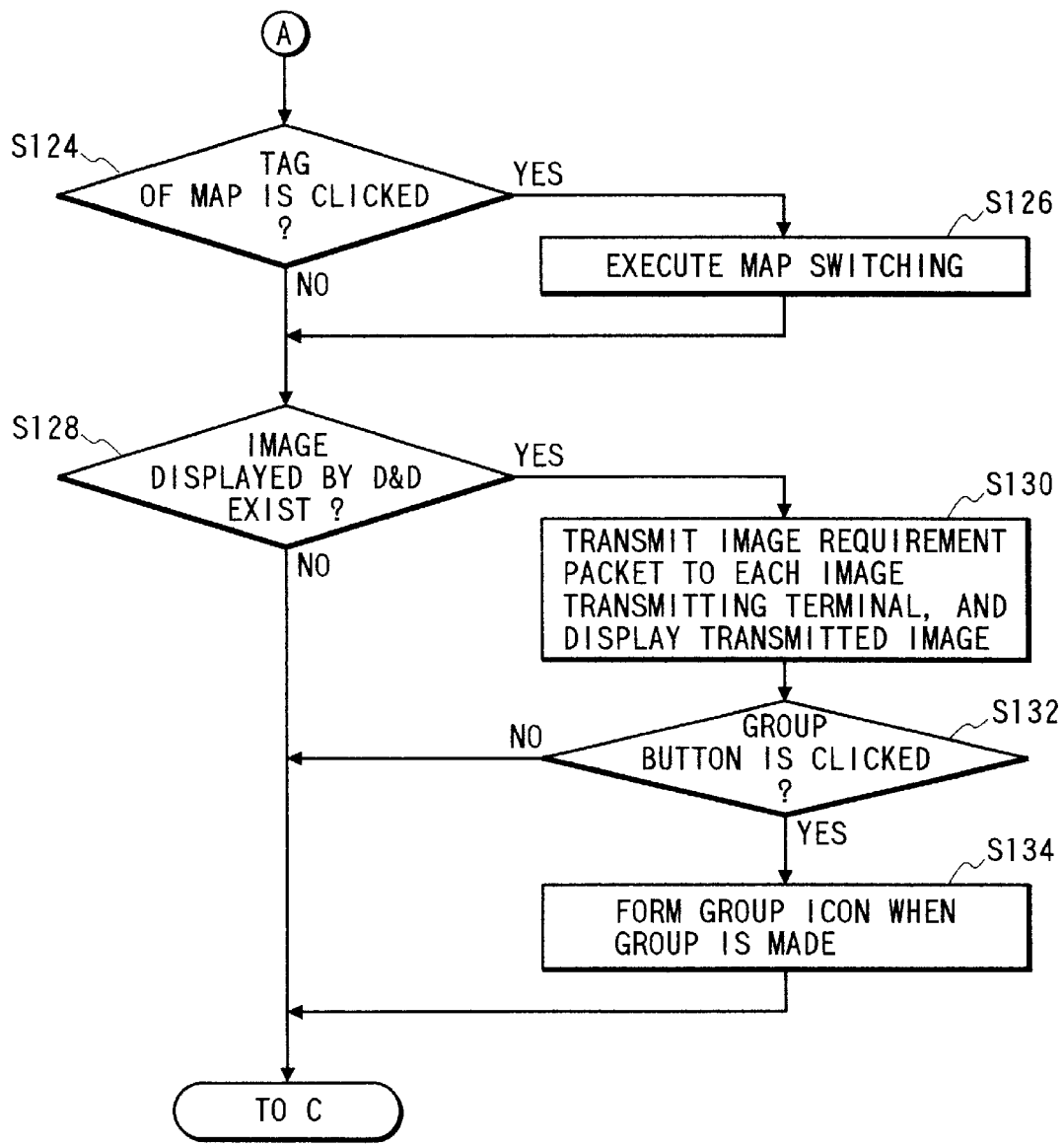
FIG. 12 shows a flow chart of an entire operation of the apparatus of the embodiment.

Referring to FIG. 11, software of the apparatus of the present embodiment described above is explained. FIGS. 11 and 12 show flow charts of an overall operation of the apparatus of the present embodiment.

Steps of the flow charts are now explained.

S100: The map managing software 413 shown in FIG. 2 displays the map window shown by 500 in FIG. 3 on the bit map display 35.

S102: Following to S100, the image receiving software 412 shown in FIG. 2 displays the image window 600 shown in FIG. 5 on the display 35.

S104: Following to S102, the camera control client 411 shown in FIG. 2 displays the camera control panel 640 shown in FIG. 6 on the display 35.

S106: Whether the camera icon displayed on the map window shown in FIG. 3 has been clicked or not is determined, and if it has been clicked, the process proceeds to S108, and if it has not been clicked, the process proceeds to S112.

While the sequence is not in order, the steps in FIG. 11 are executed by an OS complying to the CPU 122. While S100, S102 and S104 are separately executed in the above description, S100 may calls the routines of S102 and S104 for execution.

S108: The clicked focus is switched. Namely, the clicked camera is defined. In other words, a particular camera which has been selected is determined.

S110: A display process routine to be described later is started. This routine will be described in conjunction with FIG. 14.

S112: Whether a desired one of images displayed in the image window 600 shown in FIG. 5 has been clicked or not is determined. If it has been clicked, the process proceeds to S114. If it has not been clicked, the process proceeds to S120.

S114: Whether the position of the camera which generates the clicked image signal is displayed in the map window shown in FIG. 3 when the image is clicked is determined. If it is not displayed, a direction to switch the map to display the map in which the camera is included, in the window shown in FIG. 3 is issued to the map managing software 413.

S116: Like in S108, the focus of the camera corresponding to the clicked image is switched. Namely, a particular camera which has been selected is determined.

S118: A display movement control and stop process routine to be described later is started. This routine will be described in conjunction with FIG. 6.

S120: Whether the camera control panel 640 shown in FIG. 3 has been clicked or not is determined. If it has been clicked, the process branches to S122.

S122: The command designated by the control panel is transmitted to the clicked camera through the network 100.

S124: Whether one of the tags 510 to 540 of the maps shown in FIG. 3 has been clicked or not is determined. If it has been clicked, the process proceeds to S126. If it has not been clicked, the process proceeds to S128.

S126: A command to display one of the maps having tags 510 to 540 thereof has been clicked is sent to the map managing software 413.

S128: Whether the image designated as the image to be D&D displayed is present on the map displayed on the bit map display 35 or not is determined. If the designated image is present, the process proceeds to S130, and if it is not present, the process proceeds to S136.

S130: If the designated image is present, the packets including the image request signals are sequentially transmitted to the camera corresponding to the image or the image signal transmission terminal and the images transmitted from the terminal requested by the packets is displayed on the bit map display 35.

S132: Whether a grouping button has been clicked or not is determined. If it has been clicked, the process proceeds to S134. If it is not been clicked, the process proceeds to C.

S134: The cameras which transmit the camera images on the bit map display 35 are grouped and a group icon is generated.

S136: Whether the group icon has been clicked or not is determined. If the group icon has been clicked, the process proceeds to S138. If it has not been clicked, the process proceeds to B.

S138: The clicked group icon is inversely displayed.

S140: Whether the group icon has been designated for display or not is determined. If it has been designated, the process proceeds to a group display process S142 of FIG. 19 (to be described later). If it has not been designated, the process proceeds to S144.

S144: Whether a group delete button 710 has been clicked or not is determined. If it has been clicked, the process proceeds to S144. If it has not been clicked, the process proceeds to B.

S146: The designated group is deleted.

Figure 14:
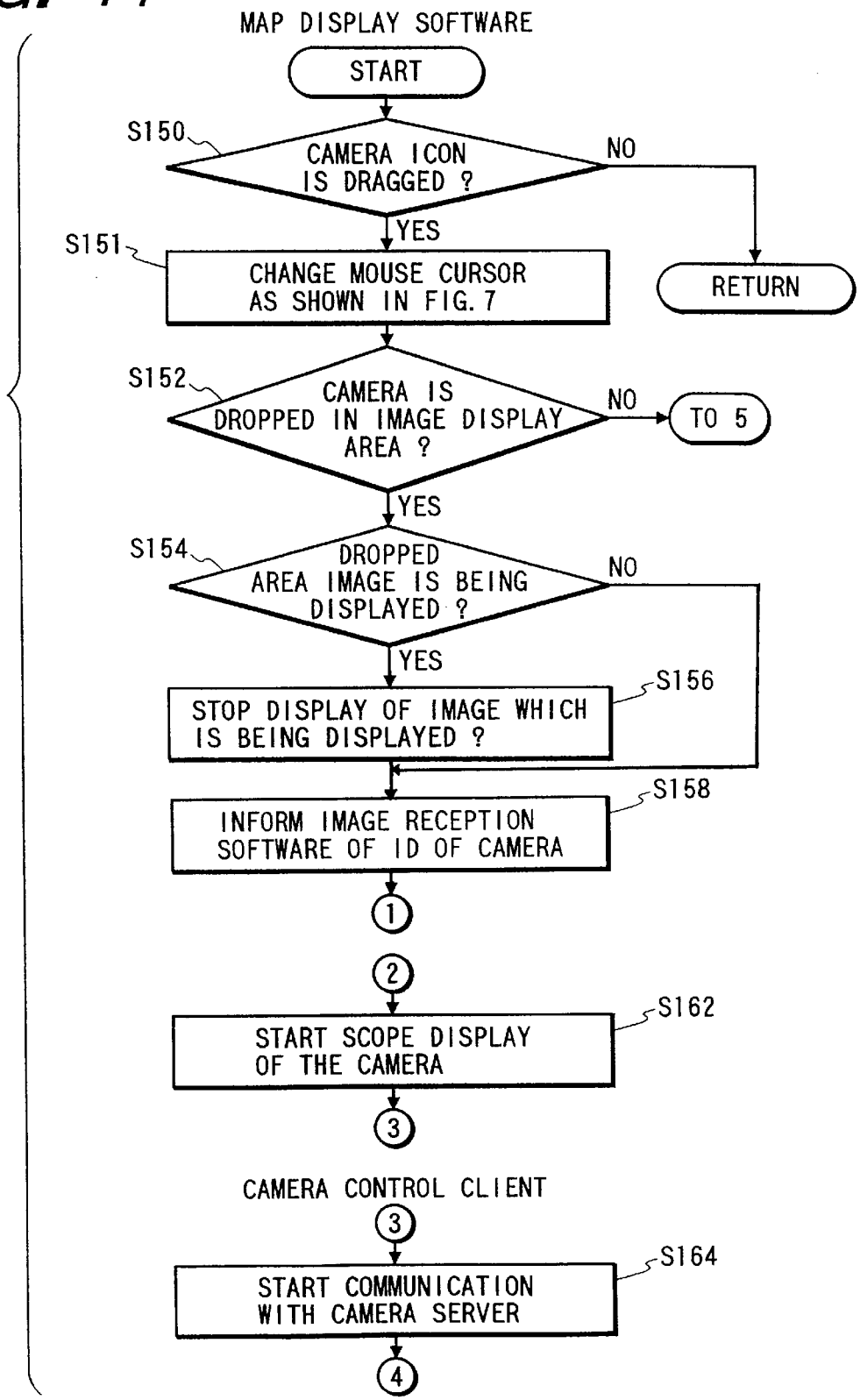
FIG. 14 shows detail of a display routine in S110 shown in FIG. 11.
Figure 15:
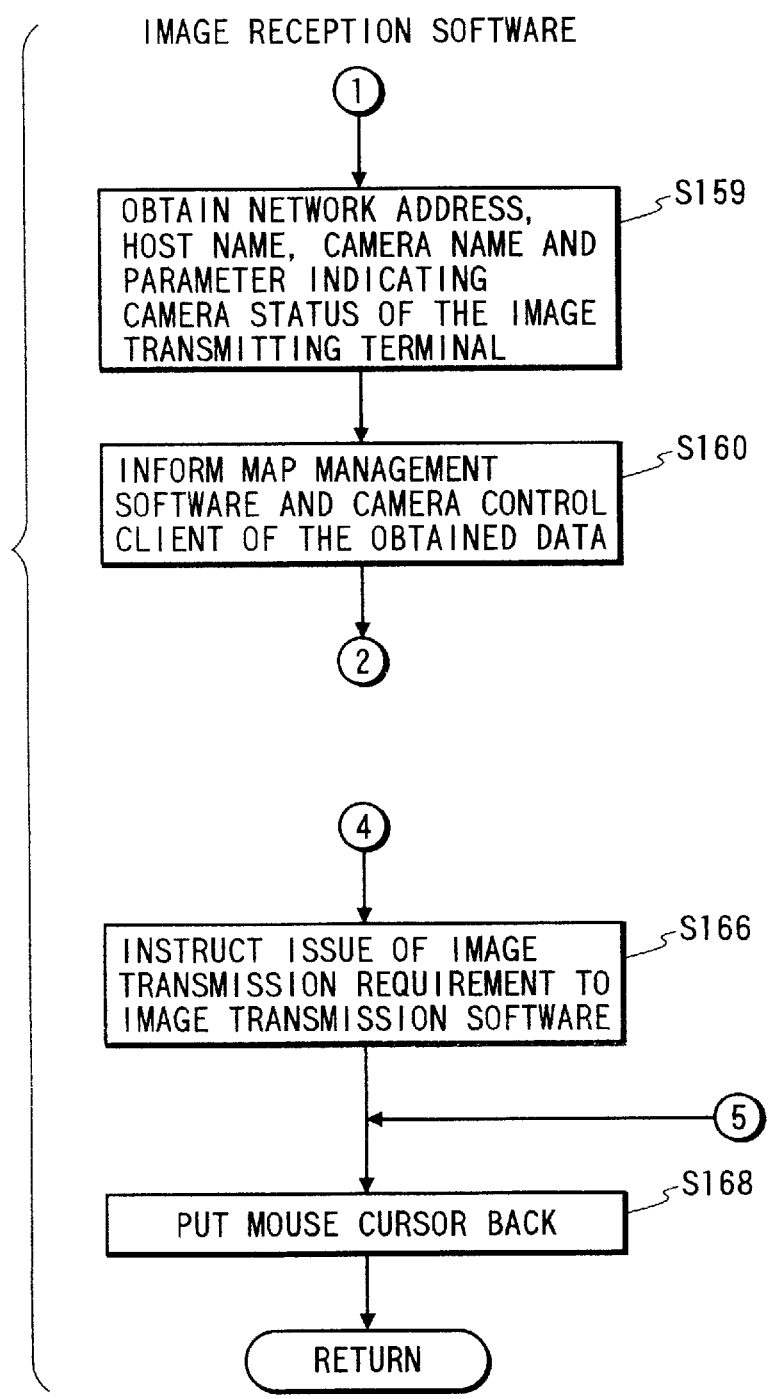
FIG. 15 shows detail of the display routine in S110 shown in FIG. 11.

Referring now to FIG. 14, the display process routine described in S110 is explained.

S150: In such a routine, whether the displayed camera icon has been dragged or not is determined. In the process, if the camera icon has been continuously clicked by the user from S106 of FIG. 11 to the present step, the process proceeds to S151. If the click has been released by the user, the present step is terminated and the process returns to the original routine.

S151: The mouse cursor is changed to the shape as shown in FIG. 7 during the dragging to facilitate the user to recognize that the camera is being dragged. The mouse cursor is not limited to the illustrated one but it may be of other shape. In essence, it is sufficient to make the user recognize that the camera is being dragged.

S152: Whether the camera having the cursor shape as shown in FIG. 7 has been dropped or not is determined from the status of the click button of the mouse 128 shown in FIG. 1. Whether the dropped camera has been dropped in any of the image display areas 610 to 620 shown in FIG. 5 is determined. In the determination, the map managing software 413 compares the respective areas of the image display areas 610 to 620 with the coordinates at which the camera shaped cursor is dropped, and if it is dropped in the area, the process branches to S154, and if it is dropped outside the area, the process branches to S168, and the mouse cursor is returned to the original shape. Namely, the state before the dragging of the camera in S150 is restored.

S154: Whether the dropped area is displaying image or not is determined by the map managing software 412. The map managing software 412 always writes in a table memory the images of the cameras and the image display areas 610 to 620 in which the images are displayed. If the image is being displayed, the process branches to S156, and if it is not being displayed, the process branches to S158.

S156: If the dropped area is displaying the image, the display of the image being displayed is stopped.

S158: The ID (identification information) of the D&Ded camera is informed to the image receiving software 412 of FIG. 2. The ID may be an ASCII code or the camera name. In essence, any identification information may be sufficient.

S159: The network address, the host name, the camera name and the parameters indicating the status of the camera of the camera having the ID informed in S158 are acquired from the main memory 124. The parameters include data of focal distance information, while balance and image pick-up orientation. The main memory 124 stores the network addresses, the host names, the camera names and the parameters indicating the status of the cameras of all image signal generation sources of the present system.

S160: The data acquired in S159 is outputted to the map managing software 413 and the camera control client 411.

S162: Based on the data acquired in S160, the scope of the camera shown by 580 in FIG. 6 or the image angle picked up by the camera, the focal distance information and the camera orientation are displayed on the map.

S164: Following to S162, communication is made with the camera control server 421.

S166: A command is issued to the image receiving software 412 to transmit the image request signal to the selected camera to receive the image signal from the selected camera. After the image receiving software 412 transmits the image request signal to the selected camera, it repeatedly outputs the above image request signal periodically until the transmission of the image signal is stopped in S178 to be described later.

Thus, the image signal of repetitive frame is outputted from the video camera and the moving image is reproduced on the monitor.

S168: The mouse cursor moved by the D&D operation is returned to the original position.

Figure 16:
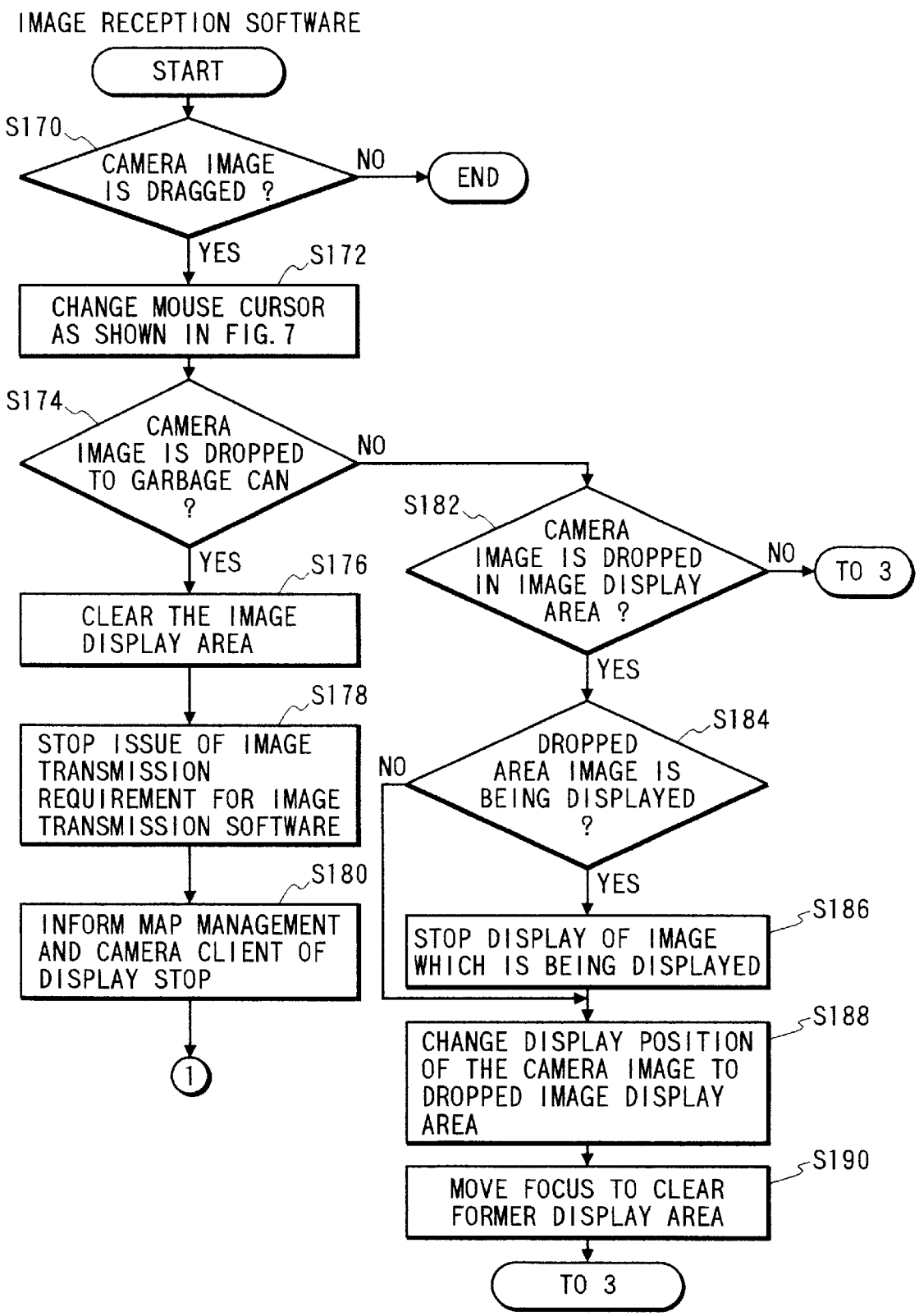
FIG. 16 shows detail of a start routine for display movement and stop in S118 shown in FIG. 11.
Figure 17:
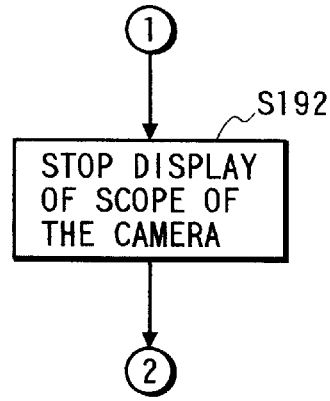
FIG. 17 shows detail of the start routine for display movement and stop in S118 shown in FIG. 11.
Figure 18:
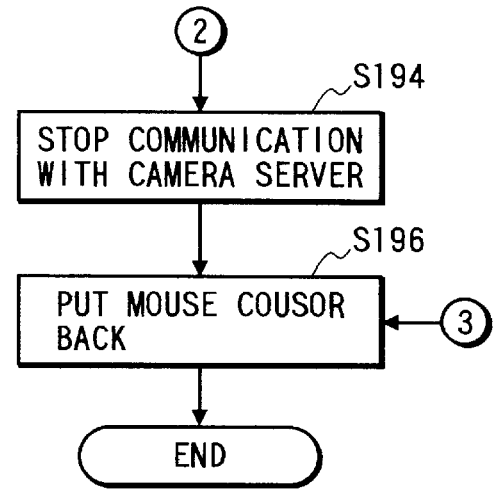
FIG. 18 shows a flow chart of a configuration of a camera control client shown in FIG. 2.

Referring to FIGS. 16 and 17, the display movement stop process routine shown in S118 of FIG. 11 is explained.

S170: Whether the image clicked in S112 has been continuously being clicked or not is determined. If it has been continuously being clicked, the process proceeds to S172, and if the click has been released, the process is terminated.

S172: The mouse cursor is changed to a shape shown in FIG. 7 as it was in S151.

S174: Whether the image dragged by the mouse cursor has been dropped in the dust box or not is determined. If it has been dropped in the dust box, the process proceeds to S176, otherwise the process proceeds to S182.

S176: When it is dropped to the dust box, the D&Ded image display area is cleared to change it to no display or blue back.

S178: The issue of the image transmission request to the communication terminal, for example, the video camera, which transmits the image cleared in S176, is stopped for the image receiving terminal 412. Thus, the communication terminal stops the communication of the image signal.

S180: Following to S178, the stop of the display on the bit map display 135 is informed to the map managing software 413 and the camera control client 411, and the process proceeds to S192.

S182: If the camera image is not dropped in the dust box in S174, a particular one of the image display areas 610 to 620 in which the camera image has been dropped is determined.

S184: Same as S154.

S186: Same as S156.

S188: The D&Ded camera image signal is displayed at the dropped image display position.

S190: The image signal in the area in which the camera image signal has previously been displayed is cleared.

S192: The display of the scope of the camera displayed in S162 is erased.

S194: The communication with the camera server is stopped.

S196: Same as S168.

The image receiving software 412 clears the image display area and stops to issue the image transmission request to the image transmission software. It also informs to the camera control client 411 and the map managing software 413 of the stop of the display.

When the camera control client receives 411 the notice, it disconnects the network connection to the camera control server and clears the image display area. The map managing software 413 removes the scope display from the camera icon 523 for the camera and updates the map.

Means for changing the number of image display areas in the present embodiment is now explained.

Figure 19:
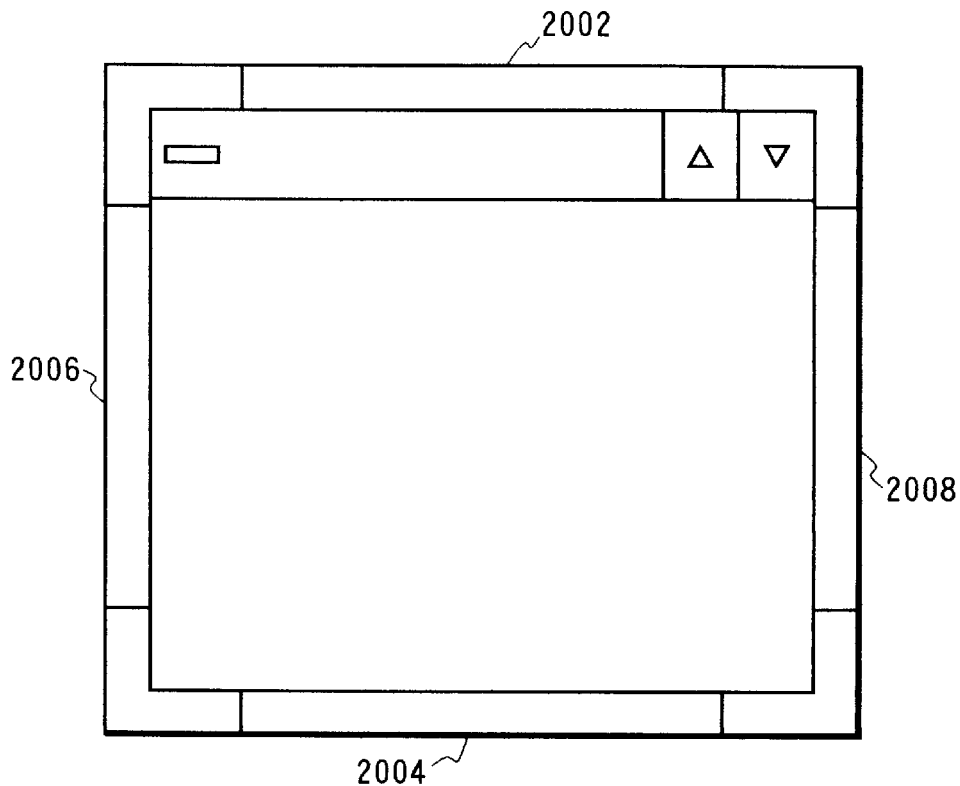
FIG. 19 shows an area utilized in resizing a window system used in the Embodiment 1.

The number of image display areas is changed in accordance with the resizing of the image display window. The resizing of the image display window is attained by the same resizing operation as that of a conventional window system. FIG. 19 shows a window displayed on the bit map display 135 of the present embodiment. Areas 2002, 2004, 2006 and 2008 are areas for resizing the map window vertically and horizontally. By D&Ding those areas, the windows may be resized in the desired direction. The resizing may be conducted by other means.

The resizing is conducted by the size of the image display areas 2002, 2004, 2006 and 2008 as a minimum unit, and if the displacement of the resizing is smaller than the image display areas, no resizing is conducted.

Figure 26:
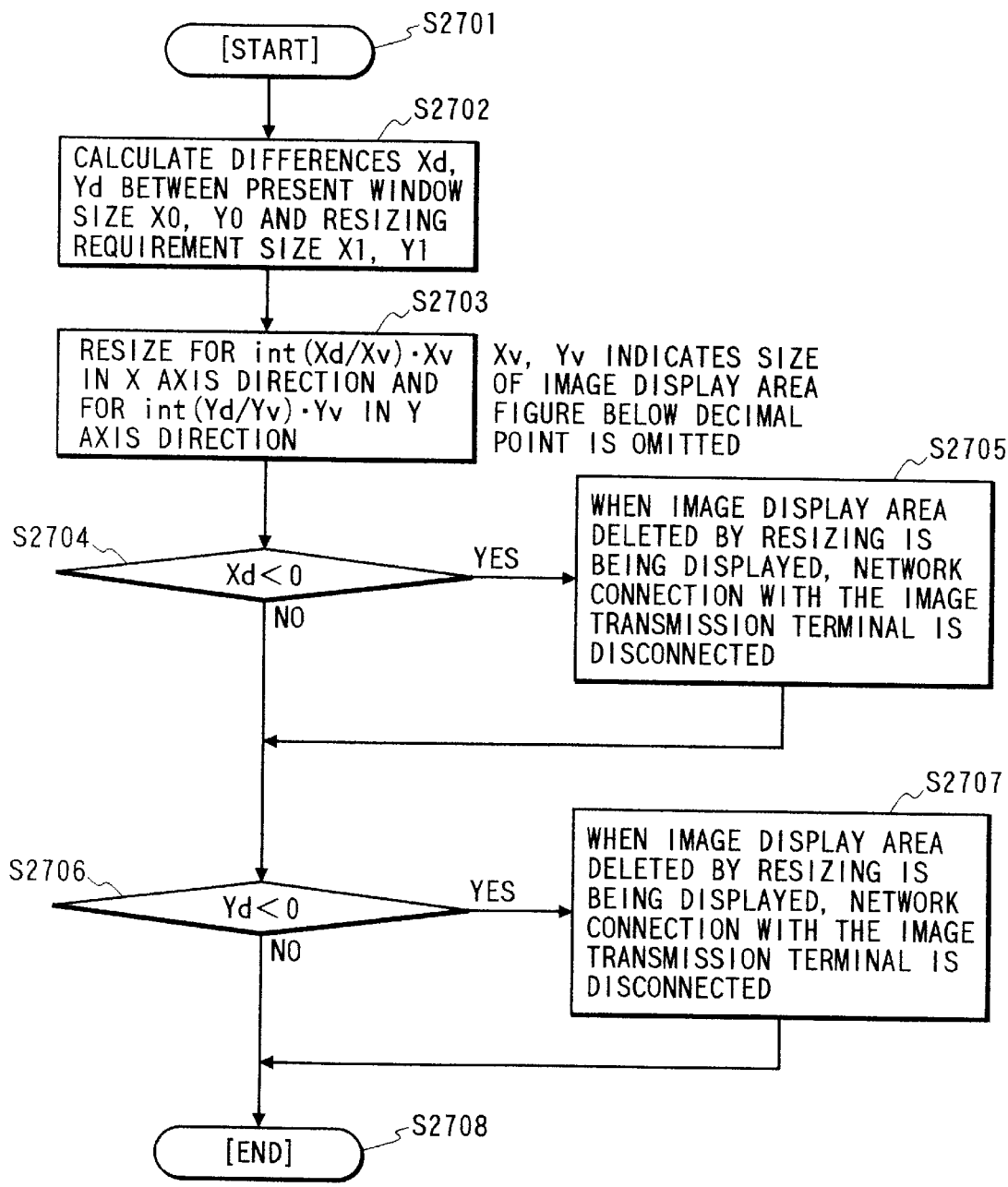
FIG. 26 shows a flow chart of an image window resizing process in the Embodiment 1.

Referring to FIG. 26, a flow chart for illustrating a resizing process is shown. When a resizing request for the image display window is issued (S2701), differences Xd and Yd between the current window sizes X0 and Y0 (where X0 represents an X-wise dimension of the window and Y0 represents a Y-wise dimension of the window) and resize requesting sizes X1 and Y1 (where X1 represents the X-wise dimension of the window and Y1 represents the Y-wise dimension of the window) are calculated. Then, for X and Y axes, ratios of the differences Xd and Yd and dimensions of the image display areas Xv and Yv are calculated and fractions are cut off. The resizing is conducted by the products of those values and Xv and Yv, respectively (S2703). In other words, when the difference between the resize request size and the current window size does not reach the dimension of the image display area, the window size is not changed without regard to the resizing request.

In this manner, the resizing is attained by the size of the image display area as the unit. In the resizing, the size of the window may be reduced. S2704 to S2007 show a process for reduction resizing in which the image display area which has been displaying the image is deleted and the image acquired from the video camera which outputted the image displayed in the deleted area is erased from the bit map display 135. Namely, in S2705 and S2707, the logical network connection of the image receiving terminal which has been transmitted the image and the monitor terminal is disconnected. By the provision of S2707 in the present embodiment, the network traffic between the image transmission terminal and the monitor terminal can be reduced.

Figure 13:
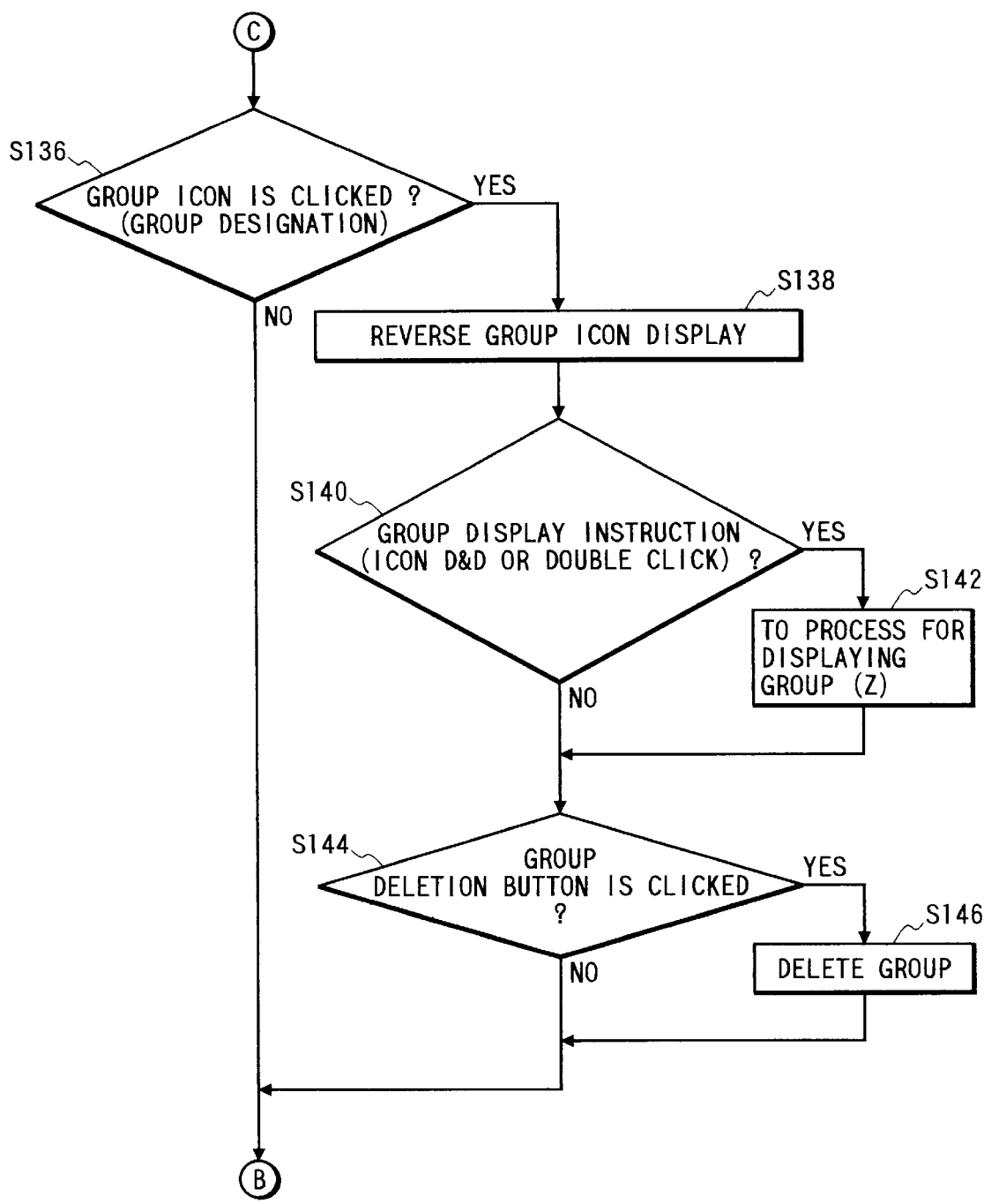
FIG. 13 shows a flow chart of an entire operation of the apparatus of the embodiment.
Figure 20:
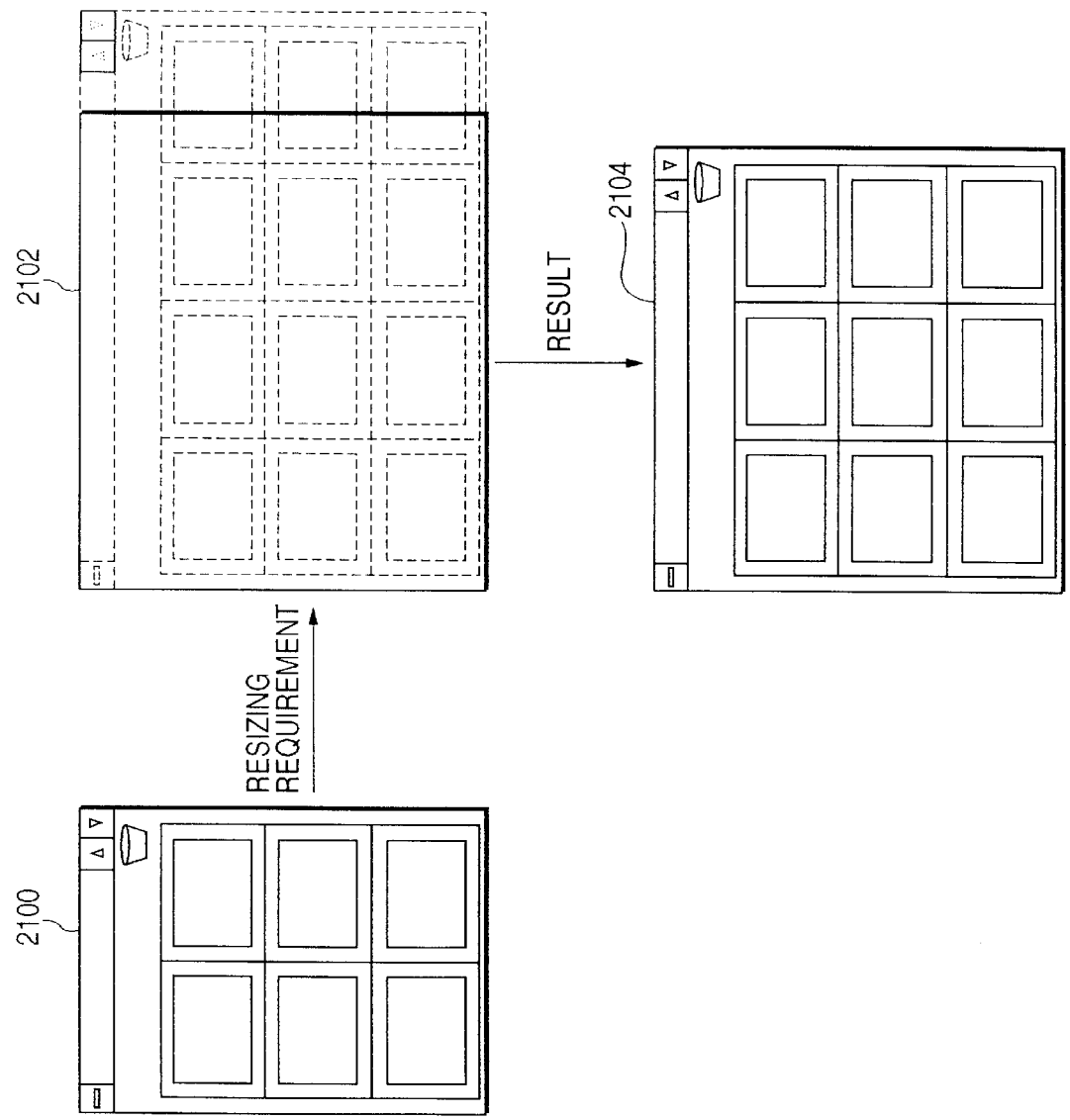
FIG. 20 shows a display when an image display window is enlarge resized by cutting out the displacement.

FIG. 20 shows a displacement of the dimension of the image window when the image display window having 2×3=6 image display areas is enlarge resized. In the illustrated example, the user originally attempted to change the image display area having the dimension 2100 to the window having the dimension 2102 by using the pointing device, but since the dimension of the image display area is the minimum unit as defined in S2703 of FIG. 13, a portion of the difference of the dimensions is cut out and the image display window having the 3×3=9 image display areas of 2104 dimension is finally resized.

Figure 21:
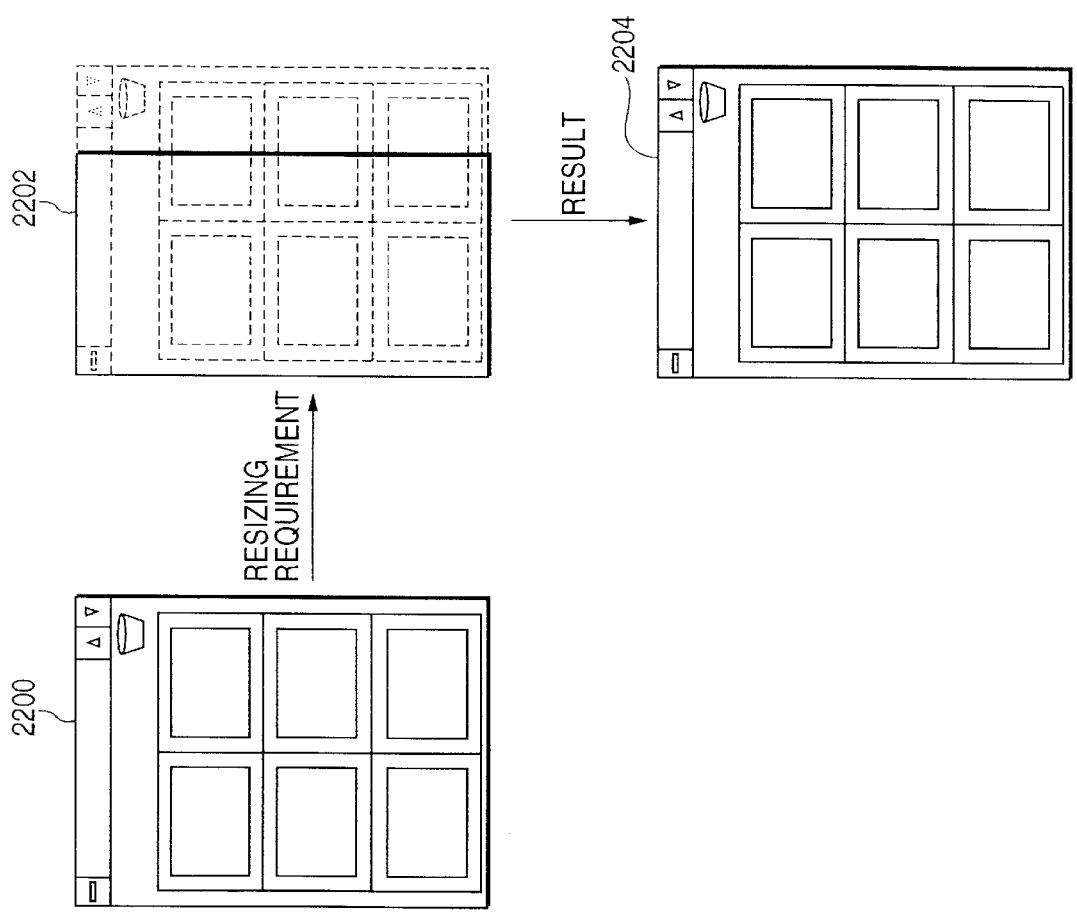
FIG. 21 shows a display when an image display window is reduction resized by cutting out the displacement.

FIG. 21 shows an example when the image display window having 2×3=6 image display areas is reduction resized. In this example, the user originally attempted to resize the image display window having the dimension 2200 to the window having the dimension 2202, but since the dimension of the image display area is the minimum unit, the displacement is cut out and the image display window having 2×3=6 image display areas of the dimension 2204 which is same as the original one is finally resized.

In the present embodiment, since the image display window is rectangular, the window may be resized to the number of image display areas corresponding to the product of any X and Y represented by x=1, 2, . . . , m and y=1, 2, . . . , n.

The number of maximum displayable image display areas is determined by m×n, where m and n are natural number not smaller than 1 and no limitation is put thereon. In actual, however, since the number of displayable image display areas is limited by the resolution of the bit map display of the monitor terminal, the values of m and n are determined based thereon.

[Embodiment 2]

An Embodiment 2 is a modification of the Embodiment 1 in the manner of rounding the displacement in the resizing. In the Embodiment 1, in resizing the image display window, the displacements on the X and Y axes are cut off when they do not reach the minimum unit, that is, the dimension of the image display area. In the present embodiment, the rounding is conducted. Thus, in the present embodiment, in S2703, an operation of int ((Xd/Xv)×Xv+1), int ((Yd/Yv)×Yv+1) is conducted.

Figure 22:
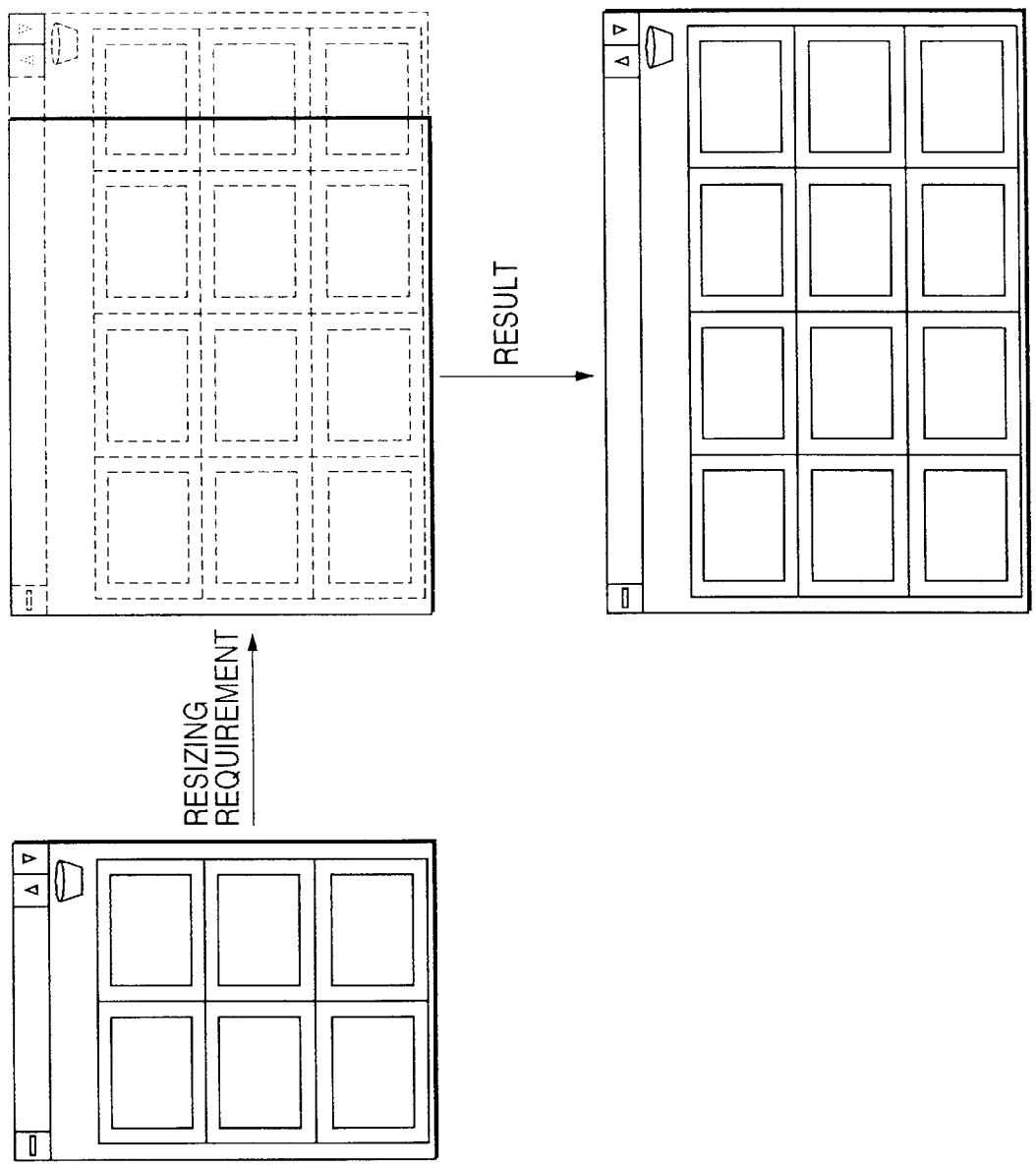
FIG. 22 shows a display when an image display window is enlarge resized by rounding the displacement.

FIG. 22 shows an example when the image display window having 2×3=6 image display areas is enlarge resized. The user attempts to resize to the dimension of 2302, but due to the rounding process, the image display window having 4×3=12 image display areas of the dimension of 2304 is finally resized.

Figure 23:
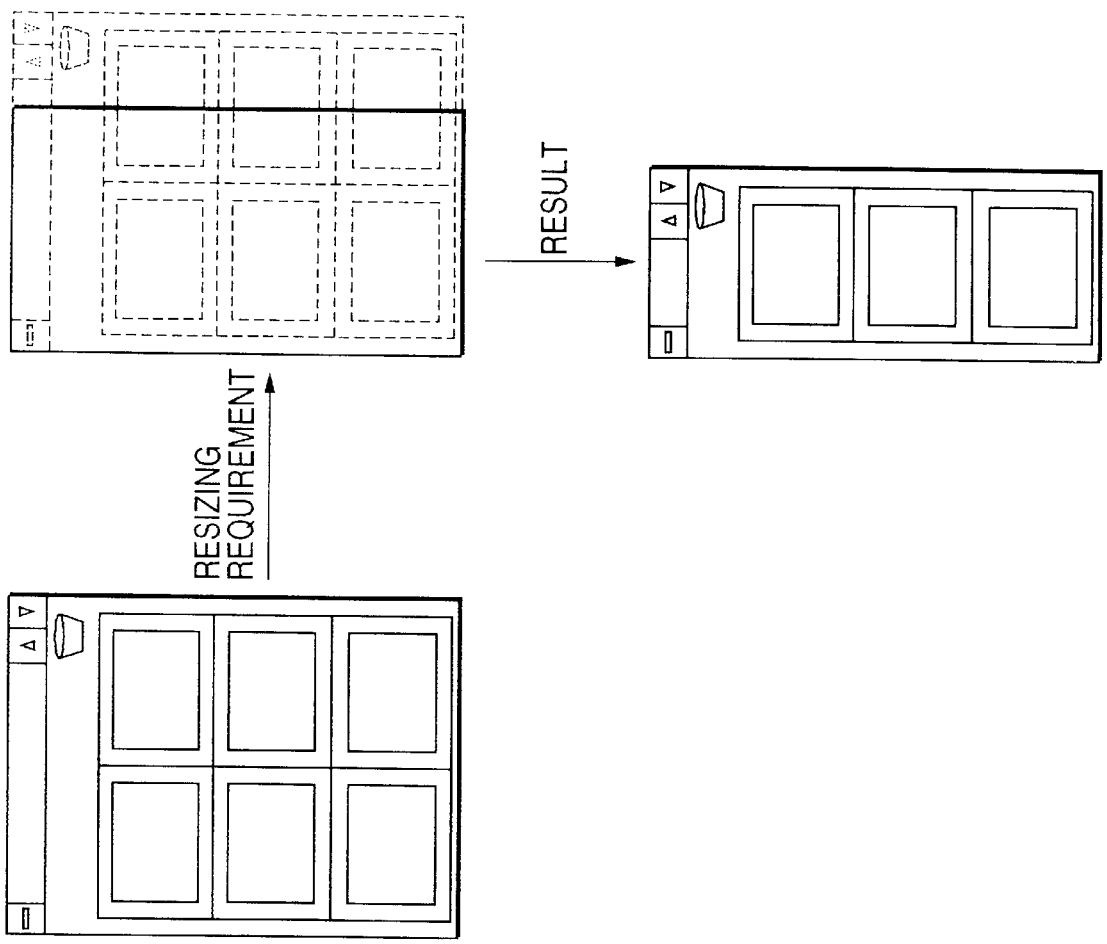
FIG. 23 shows a display when an image display window is reduction resized by rounding the displacement.

FIG. 23 shows an example when the image display window having 2×3=6 image display areas is reduction resized. Because of the rounding process, the image display window having 1×3=3 image display areas of the dimension of 2404 is finally resized.

[Embodiment 3]

In an Embodiment 3, the Embodiment 1 and the Embodiment 2 are combined so that the processes in enlarge resizing and reduction resizing are changed. In the enlarge resizing, the rounding process as shown in FIG. 22 is used, and in the reduction resizing, the cut-out process as shown in FIG. 21 is used.

[Embodiment 4]

In an Embodiment 4, the Embodiment 1 and the Embodiment 2 are combined so that the processes in the enlarge resizing and the reduction resizing are changed. In the enlarge resizing, the cut-out process as shown in FIG. 20 is used, and in the reduction resizing, the rounding process as shown in FIG. 23 is used.

[Embodiment 5]

Figure 25:
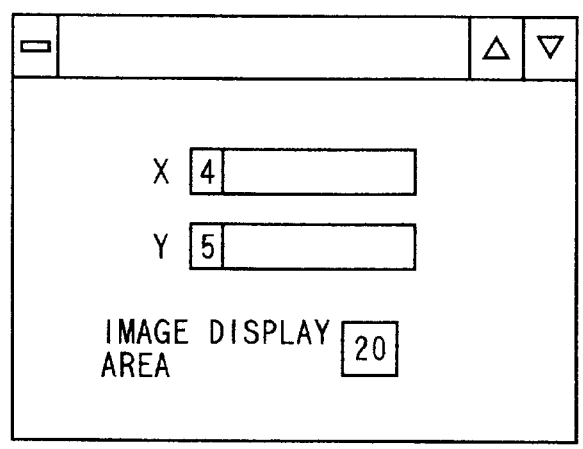
FIG. 25 shows a dialog box in the Embodiment 5.

In an Embodiment 5, the number of image display areas is directly inputted. The numbers of X and Y are inputted by the dialog box shown in FIG. 25.

[Embodiment 6]

In an Embodiment 6, the image display areas in excess of the limitation of resolution of the bit map display of the monitor terminal in the Embodiment 1 are handled.

Figure 24:
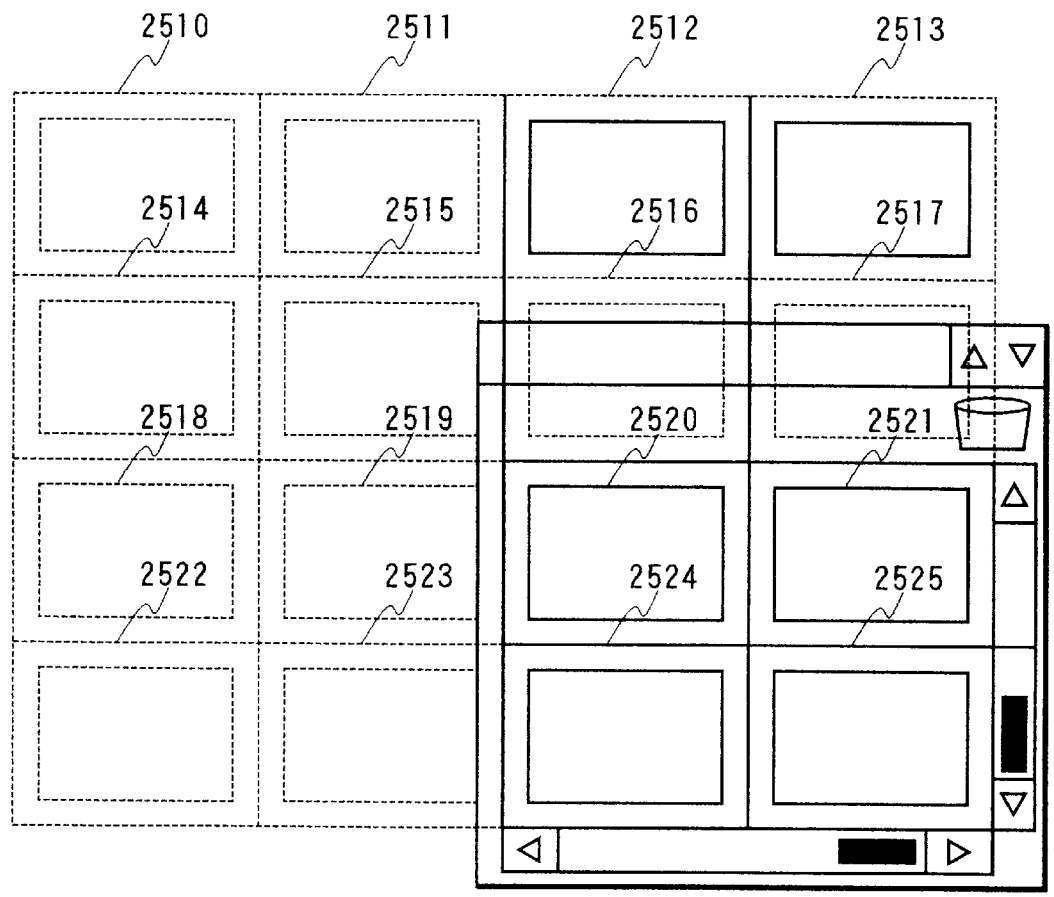
FIG. 24 shows an image display window in the Embodiment 6.

Specifically, the image display window is provided with scroll bars in X and Y directions to remove the limitation of m and n. FIG. 24 shows a display when operated in an environment of m, n=4, 4 and x, y=2, 2.

In FIG. 24, when all image display areas are displaying images, the image transmission terminal responsible to the images of the areas other than the actually displayed area 2520, 2521, 2524 and 2525 has no sense to transmit the images.

Such wasteful network flow from the image transmission terminal not only wastes the network and the common resources but also the transmission of the necessary information over the network may be sacrificed because of the increase of the volume of image data flown over the network, and may increase the processing by the monitor terminal, which prevents the smooth processing and bring difficulties in the monitor operation by the user.

However, if the logical network connection with the image transmission terminal responsible for the images of the image display areas is disconnected, the disconnection process and the reconnection process are additionally required in the scrolling operation.

Figure 27:
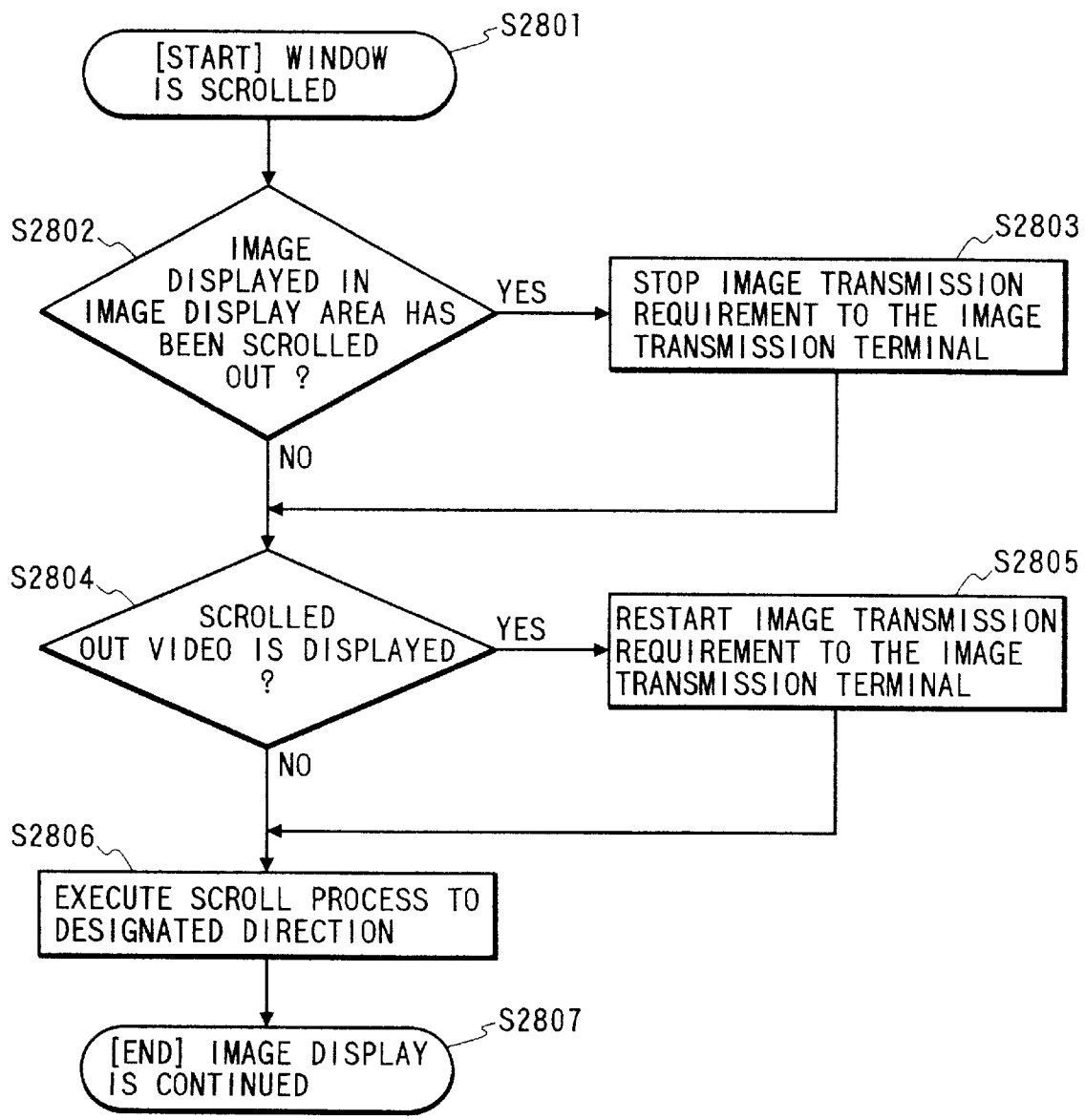
FIG. 27 shows a flow chart of an image window scrolling process in the Embodiment 6.

Thus, in accordance with the present embodiment, as shown in FIG. 27, when the image display area which currently displays the image is no longer displayed by the scrolling, the logical network connection is continued and the issuance of the image transmission request from the monitor terminal to the image transmission terminal is interrupted (S2803), and when the image display area is again displayed by the scrolling, the issuance of the image transmission request from the monitor terminal to the image transmission terminal is resumed (S2805).

By the above process, the reduction of the network flow, the reduction of the processing of the monitor terminal and the smooth handling of the GUI are attained. Further, when the image display area is again displayed by the scrolling, necessary image can be instantly displayed on the monitor.

In accordance with the Embodiment 1 of the present invention, means for resizing the image display window to change the arrangement of the image display areas and the number thereof is provided so that the flexible window arrangement of the image display areas and the maps is attained and the map window and the image display window do not overlap and the present system can comply flexible arrangement request by the user. For example, for a landscape type map, the image display areas may be arranged in 4×1 and the image display window is arranged at the top or the bottom of the screen, and for a portrait type map, the image display areas are arranged in 1×4 and the image display window is arranged at the left or the right of the screen so that the same number of images can be displayed in spite of the difference in the shape of the map.

Further, since the minimum unit of resizing is set to the dimension of the image display area, the image is always displayed in its entity and no clipping is required. Thus, the improvement of the overall system performance is expected.

When images are to be simultaneously monitored in excess of the number of images which can be steadily monitored, the number of image display areas can be readily increased and it is advantageous for emergent use.

In resizing the image display window, the Embodiment 1 which conduct the cut-out process may be hard to use for the user who desires to change the number of image display areas in resizing. For such user, the Embodiment 2 in which the number of image display areas is always changed in resizing may be used to improve the operability.

When the dimension of the display area is large, the drug distance of the mouse is long in resizing in the Embodiment 1. For the user who feels inconvenience to such operation, the Embodiment 5 is effective.

In the Embodiments 1 to 5, when the image display window is reduced and the number of image display areas is reduced, the logical network connection with the image transmission terminal which has been transmitting the image is disconnected for the deleted image display areas which have been displaying the images. Thus, the network flow and the processing by the monitor terminal are reduced.

In the Embodiment 6, the scrolling bar is used to remove the restriction on the display areas that can be handled.

Further, even if the number of image display areas that can be handled does not exceed the limit due to the resolution of the bit map display, the dimension of the image display window can be reduced to a fixed value. This is advantageous when a large size map is to be handled.

Further, the logical network connection with the image transmission terminal which is no longer displayed by the scrolling is not disconnected but only the issuance of the transmission request is interrupted, and when it is again displayed by the scrolling, the issuance of the transmission request is resumed. Thus, the reconnection process in the scrolling process is reduced, the network flow is reduced and the processing by the monitor terminal is reduced so that easy-to-use GUI is provided. The present invention further includes a machine-readable medium when the control procedures of the present embodiment is stored in a medium readable by a computer and the control procedures stored in the medium are executed to control the connection of the video camera and the communication path. Such a medium may be ROM, RAM, optical disk or magnetic disk, and it is not limited by a format of the medium.

In accordance with the present embodiment, the arrangement of the image transmission sources and efficient arrangement and display of the images from the transmission sources are attained.

Further, since the communication means is controlled in accordance with the change of the size of the window in which the image is displayed, the efficient communication is attained and when required, the received image can be instantly displayed in the window.

What is claimed is:

1. An image processing apparatus comprising:
   supply means for displaying arrangement diagram indicating an arrangement for a plurality of image transmission sources and images from said image transmission sources in a window on a monitor;
   control means for controlling a size of said window in accordance with the number of images to be displayed in said window or vice versa; and
   control means for controlling the communication with said image transmission sources in accordance with the number of images to be displayed in said window.

2. An image processing apparatus according to claim 1, wherein said supply means arranges image display areas for displaying the images from said image transmission sources in matrix on an image display window.

3. An image processing apparatus according to claim 1, further comprising:
   means for changing the number of image display areas in response to the change of the size of said image display window.

4. An image processing apparatus according to claim 1, wherein a minimum unit in changing the size of said image display window is determined by a size of rectangle of the image display area.

5. An image processing apparatus according to claim 1, wherein said control means resizes said window in accordance with the number of images to be displayed in said window.

6. An image processing apparatus comprising:
   supply means for displaying arrangement diagram indicating an arrangement for a plurality of image transmission sources and images from said image transmission sources in a window on a monitor;
   control means for controlling a size of said window in accordance with the number of images to be displayed in said window or vice versa; and
   control means for controlling the communication with said image transmission sources in accordance with the number of images to be displayed in said window; and
   holding means for holding a logical network connection with a video transmission terminal which transmits an image when the image display area which has been displaying the image is no longer displayed on the display device as a result of the control of the number of images.

7. An image processing apparatus comprising:
   supply means for displaying arrangement diagram indicating an arrangement for a plurality of image transmission sources and images from said image transmission sources in a window on a monitor;
   control means for controlling a size of said window in accordance with the number of images to be displayed in said window or vice versa; and
   control means for controlling the communication with said image transmission sources in accordance with the number of images to be displayed in said window; and
   issuing means for issuing an image transmission request to an image transmission terminal for which the issuance of the image transmission request has been interrupted when the image display area for displaying the image of the image transmission terminal is redisplayed on the display device by a scrolling process.

8. A communication apparatus comprising:
   communication means for connecting a plurality of image transmission sources and a network; and
   control means for controlling said communication means in accordance with a size of said window;
   wherein said communication control means controls said communication means in response to a command to change the size of said window.

9. A communication apparatus according to claim 8, wherein said communication means controls the number of images in said window in accordance with the size of said window and connects the image transmission sources corresponding in number to the number of images to the network.

10. An image processing method comprising the steps of:
    displaying arrangement diagram indicating an arrangement of a plurality of image transmission sources and images from said image transmission sources in a window on a monitor;
    controlling a size of said window in accordance with the number of images to be displayed in said window or vice versa; and
    controlling the communication with said image transmission sources in accordance with the number of images to be displayed in said window.

11. An image processing method according to claim 10, wherein image display areas for displaying the images from said image transmission sources are displayed in matrix on an image display window.

12. An image processing method according to claim 10, further comprising the step of:
    changing the number of image display areas in response to the change of the size of said image display window.

13. An image processing method according to claim 10, wherein a minimum unit in changing the size of said image display window in said control is determined by a size of rectangle of the image display area.

14. An image processing method according to claim 10, wherein said window is resized in accordance with the number of images to be displayed in said window.

15. A machine-readable medium containing the steps of said image processing method according to claim 10.

16. An image processing method comprising the steps of:

displaying arrangement diagram indicating an arrangement of a plurality of image transmission sources and images from said image transmission sources in a window on a monitor;

controlling a size of said window in accordance with the number of images to be displayed in said window or vice versa;

controlling the communication with said image transmission sources in accordance with the number of images to be displayed in said window; and holding a logical network connection with an image transmission terminal which transmits an image when the image display area which has been displaying the image is no longer displayed on the display device as a result of the control of the number of images.

17. An image processing method comprising the step of:

displaying arrangement diagram indicating an arrangement of a plurality of image transmission sources and images from said image transmission sources in a window on a monitor;

controlling a size of said window in accordance with the number of images to be displayed in said window or vice versa;

controlling the communication with said image transmission sources in accordance with the number of images to be displayed in said window; and issuing an image transmission request to an image transmission terminal for which the issuance of the image transmission request has been interrupted when the image display area for displaying the image of the image transmission terminal is redisplayed on the display device by a scrolling process.

18. A communication method comprising the step of:

connecting a plurality of image transmission sources and a network by communication means;

displaying images received from said image transmission sources in a window on a monitor; and controlling said communication means in response to a command to change the size of said window.

19. A communication method according to claim 18, wherein said communication means controls the number of images in said window in accordance with the size of said window and connects the image transmission sources corresponding in number to the number of images to the network.

20. A machine-readable medium containing the steps of said communication method according to claim 18.

* * * * *

UNITED STATES PATENT AND TRADEMARK OFFICE
CERTIFICATE OF CORRECTION

PATENT NO. : 5,825,432
DATED : October 20, 1998
INVENTOR(S) : Hiroki Yonezawa

It is certified that error appears in the above-identified patent and that said Letters Patent is hereby corrected as shown below:

On the title page: Item [54] and Column 1, lines 1-4,

IN THE TITLE:

Please delete "Communication Apparatus Image Processing Apparatus, Communication Method, Image Processing Method and Medium" and insert therefor -- Communication Apparatus, Image Processing Apparatus, Communication Method, Image Processing Method and Medium --.

Signed and Sealed this

Second Day of March, 1999

Attest:

Q. TODD DICKINSON

*Attesting Officer*  *Acting Commissioner of Patents and Trademarks*